US012734662B2

(12) United States Patent
Roubik et al.

(10) Patent No.: US 12,734,662 B2
(45) Date of Patent: Sep. 15, 2026

(54) ONE-PIECE FILL VALVE FOR POWERED FASTENER DRIVER

(71) Applicant: MILWAUKEE ELECTRIC TOOL CORPORATION, Brookfield, WI (US)

(72) Inventors: Benjamin J. Roubik, Milwaukee, WI (US); David M. Pittman, Sussex, WI (US); Ryan P. Weister, Waukesha, WI (US); Alex G. Bournoville, New Berlin, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/140,042

(22) Filed: Apr. 27, 2023

(65) Prior Publication Data

US 2023/0356376 A1 Nov. 9, 2023

Related U.S. Application Data

(60) Provisional application No. 63/369,150, filed on Jul. 22, 2022, provisional application No. 63/349,716, (Continued)

(51) Int. Cl.
*B25C 1/04* (2006.01)

(52) U.S. Cl.
CPC .............. *B25C 1/047* (2013.01); *B25C 1/042* (2013.01)

(58) Field of Classification Search
CPC ........... B25C 1/06; B25C 1/047; B25C 1/042; F16K 15/1825; F16K 15/147
See application file for complete search history.

(56) References Cited

U.S. PATENT DOCUMENTS 3,392,632 A 7/1968 Volkmann
3,605,560 A 9/1971 Bolte
(Continued)

FOREIGN PATENT DOCUMENTS

CN 210232909 U 4/2020
WO 2021158940 A1 8/2021
WO 2021192838 A1 9/2021

OTHER PUBLICATIONS

Extended European Search Report for Application No. 23171144.1 dated Oct. 26, 2023 (12 pages).
(Continued)

*Primary Examiner* — Thomas M Wittenschlaeger
(74) *Attorney, Agent, or Firm* — Michael Best & Friedrich LLP

(57) ABSTRACT

A powered fastener driver including a storage chamber cylinder, a fill port, and a one-piece fill valve. The storage chamber cylinder encloses a piston cylinder and defines therewith a storage chamber in which compressed gas is stored. The fill port is in communication with the storage chamber. The one-piece fill valve is at least partially positioned within the fill port. The fill valve includes a slit, which, in a closed state, prevents gas in the storage chamber from being discharged to the atmosphere through the fill valve. In an open state of the slit, the slit permits the storage chamber to be refilled with compressed gas through the fill valve. A pressure exerted on a portion of the fill valve in which the slit is defined by compressed gas within the storage chamber maintains the slit in the closed state.

11 Claims, 13 Drawing Sheets

Related U.S. Application Data filed on Jun. 7, 2022, provisional application No. 63/337,647, filed on May 3, 2022.

(56) References Cited

U.S. PATENT DOCUMENTS

| | | | | |
|---|---|---|---|---|
| 3,618,632 | A | 11/1971 | Stevens | |
| 5,372,578 | A * | 12/1994 | Kriesel | A61M 5/152<br>604/9 |
| 6,089,260 | A * | 7/2000 | Jaworski | F16K 15/147<br>137/846 |
| 7,419,079 | B2 | 9/2008 | Chen et al. | |
| 9,618,130 | B1 | 4/2017 | Nguyen | |
| 2004/0031839 | A1 | 2/2004 | Pruyne | |
| 2017/0198824 | A1* | 7/2017 | Nguyen | B65D 1/10 |
| 2020/0290189 | A1* | 9/2020 | Owens | B25C 1/005 |
| 2020/0398583 | A1 | 12/2020 | Asawa et al. | |
| 2020/0406439 | A1 | 12/2020 | Fujimoto et al. | |
| 2021/0031348 | A1 | 2/2021 | Kobori et al. | |

OTHER PUBLICATIONS

Partial European Search Report for Application No. 23171144.1 dated Jul. 26, 2023 (14 pages).

* cited by examiner

ONE-PIECE FILL VALVE FOR POWERED FASTENER DRIVER

CROSS-REFERENCE TO RELATED APPLICATION

This application claims priority to U.S. Provisional Patent Application No. 63/369,150 filed on Jul. 22, 2022, U.S. Provisional Patent Application No. 63/349,716 filed on Jun. 7, 2022, and U.S. Provisional Patent Application No. 63/337,647 filed on May 3, 2022, the entire contents of all of which are incorporated herein by reference.

FIELD OF THE INVENTION

The present invention relates to powered fastener drivers, and more specifically to gas spring-powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g. compressed air generated by an air compressor, electrical energy, a flywheel mechanism, etc.), but often these designs are met with power, size, and cost constraints.

SUMMARY OF THE INVENTION

The present invention provides, in one aspect, a powered fastener driver. The powered fastener driver includes a piston cylinder, a piston, a driver blade, a lifter, a storage chamber cylinder, a fill port, and a one-piece fill valve. The piston is movable and is positioned within the piston cylinder. The driver blade is attached to the piston and movable therewith between a top-dead-center position and a bottom-dead-center position. The lifter is operable to move the driver blade from a driven position corresponding with the bottom-dead-center position toward a ready position. The storage chamber cylinder encloses the piston cylinder and defines therewith a storage chamber in which compressed gas is stored. The fill port is coupled to the storage chamber cylinder and is in communication with the storage chamber. The one-piece fill valve is at least partially positioned within the fill port. The fill valve includes a slit which, in a closed state, prevents gas in the storage chamber from being discharged to the atmosphere through the fill valve. In an open state of the slit, the slit permits the storage chamber to be refilled with compressed gas through the fill valve. A pressure exerted on a portion of the fill valve in which the slit is defined by compressed gas within the storage chamber maintains the slit in the closed state.

The present invention provides, in another aspect, a powered fastener driver. The powered fastener driver includes a piston cylinder, a piston, a driver blade, a lifter, a storage chamber cylinder, a fill port, and a one-piece fill valve. The piston is movably positioned within the piston cylinder. The driver blade is attached to the piston and is movable therewith between a top-dead-center position and a bottom-dead-center position. The lifter is operable to move the driver blade from a driven position corresponding with the bottom-dead-center position toward a ready position. The storage chamber cylinder encloses the piston cylinder and defines therewith a storage chamber in which compressed gas is stored. The fill port is coupled to the storage chamber cylinder and is in communication with the storage chamber. The one-piece fill valve is at least partially positioned within the fill port. The fill valve includes a body portion defining a receptacle, a tip portion terminating at a tip end, and a slit extending from the receptacle of the body portion to the tip end of the tip portion. The slit is movable between a closed state in which compressed gas in the storage chamber in prevented from being discharged to the atmosphere through the fill valve, and an open state which permits the storage chamber to be refilled with compressed gas through the fill valve. A pressure exerted on the tip end of the fill valve by compressed gas within the storage chamber maintains the slit in the closed state. The tip portion is configured to be received in the storage chamber cylinder.

The present invention provides, in another aspect, a powered fastener driver. The gas spring-powered fastener driver includes a piston cylinder, a piston, a driver blade, a lifter, a storage chamber cylinder, a fill port, a one-piece fill valve, and a plug. The piston is movably positioned within the piston cylinder. The drive blade is attached to the piston and is movable therewith between a top-dead-center position and a bottom-dead-center position. The lifter is operable to move the driver blade from a driven position corresponding with the bottom-dead-center position and toward a ready position. The storage chamber cylinder encloses the piston cylinder and defines therewith a storage chamber in which compressed gas is stored. The fill port is coupled to the storage chamber cylinder and is in communication with the storage chamber. The one-piece fill valve is at least partially positioned within the fill port. The fill valve includes a slit which, in a closed state, prevents compressed gas in the storage chamber from being discharged to atmosphere through the fill valve, and in an open state, permits the storage chamber to be refilled with compressed gas through the fill valve. The plug is configured to engage the fill port to inhibit access of the fill valve.

The present invention provides, in another aspect, a powered fastener driver. The gas spring-powered fastener driver includes a piston cylinder, a piston, a driver blade, a lifter, a storage chamber cylinder, a fill port, a one-piece fill valve, and a plug. The piston is movably positioned within the piston cylinder. The drive blade is attached to the piston and is movable therewith between a top-dead-center position and a bottom-dead-center position. The lifter is operable to move the driver blade from a driven position corresponding with the bottom-dead-center position toward a ready position. The storage chamber cylinder encloses the piston cylinder and defines therewith a storage chamber in which compressed gas is stored. The fill port is coupled to the storage chamber cylinder and is in communication with the storage chamber. The one-piece fill valve having a slit in a tip thereof and an adjacent a receptacle, and is at least partially positioned within the fill port. The fill valve includes a slit, in a closed state, prevents compressed gas in the storage chamber from being discharged to atmosphere through the fill valve, and in an open state, permits the storage chamber to be refilled with compressed gas through the fill valve. The plug has a tip configured to engage the receptacle of the one-piece fill valve to inhibit access of the fill valve.

The present invention provides, in another aspect, a powered fastener driver. The gas spring-powered fastener driver includes a piston cylinder, a piston, a driver blade, a lifter, a storage chamber cylinder, a fill port, a one-piece fill valve, an adapter, and a needle. The piston is movably positioned within the piston cylinder. The drive blade is attached to the piston and is movable therewith between a top-dead-center position and a bottom-dead-center position. The lifter is operable to move the driver blade from a driven position corresponding with the bottom-dead-center position toward a ready position. The storage chamber cylinder encloses the piston cylinder and defines therewith a storage chamber in which compressed gas is stored. The fill port is coupled to the storage chamber cylinder and is in communication with the storage chamber. The one-piece fill valve has a receptacle. The one-piece fill valve it at least partially positioned within the fill port. The fill valve includes a slit which, in a closed state, prevents compressed gas in the storage chamber from being discharged to atmosphere through the fill valve. In an open state of the slit, the storage chamber is permitted to be refilled with compressed gas through the fill valve. The adapter is coupled to the fill port adjacent the one-piece fill valve. The adapter has a cavity. The needle has a tip and a projection. The tip is configured to pass through the cavity and pierce the slit of the fill valve. The projection is configured to contact the receptacle of the fill valve to prevent compressed gas in the storage chamber from being discharged to atmosphere through the fill valve.

The present invention provides, in another aspect, a powered fastener driver. The gas spring-powered fastener driver includes a piston cylinder, a piston, a driver blade, a lifter, a storage chamber cylinder, a fill port, and a one-piece fill valve. The piston is movable and is positioned within the piston cylinder. The driver blade is attached to the piston and movable therewith along a driving axis between a top-dead-center position and a bottom-dead-center position. The lifter is operable to move the driver blade from a driven position corresponding with the bottom-dead-center position toward a ready position. The storage chamber cylinder encloses the piston cylinder and defines therewith a storage chamber in which compressed gas is stored. The storage chamber cylinder has an annular inner wall surrounding the driving axis. The fill port is coupled to the storage chamber cylinder and is in communication with the storage chamber. The fill port extends along a filling axis tangent to the annular inner wall. The one-piece fill valve is at least partially positioned within the fill port. The fill valve includes a slit which, in a closed state, prevents gas in the storage chamber from being discharged to the atmosphere through the fill valve. In an open state of the slit, the slit permits the storage chamber to be refilled with compressed gas through the fill valve. A pressure exerted on a portion of the fill valve in which the slit is defined by compressed gas within the storage chamber maintains the slit in the closed state.

The present invention provides, in another aspect, a powered fastener driver. The gas spring-powered fastener driver includes a piston cylinder, a piston, a driver blade, a lifter, a storage chamber cylinder, a fill port, and a one-piece fill valve. The piston is movable and is positioned within the piston cylinder. The driver blade is attached to the piston and movable therewith along a driving axis between a top-dead-center position and a bottom-dead-center position. The lifter is operable to move the driver blade from a driven position corresponding with the bottom-dead-center position toward a ready position. The storage chamber cylinder encloses the piston cylinder and defines therewith a storage chamber in which compressed gas is stored. The fill port is coupled to the storage chamber cylinder and is in communication with the storage chamber. The fill port extends along a filling axis that is obliquely oriented relative to the driving axis. The one-piece fill valve is at least partially positioned within the fill port. The fill valve includes a slit which, in a closed state, prevents gas in the storage chamber from being discharged to the atmosphere through the fill valve. In an open state of the slit, the slit permits the storage chamber to be refilled with compressed gas through the fill valve. A pressure exerted on a portion of the fill valve in which the slit is defined by compressed gas within the storage chamber maintains the slit in the closed state.

The present disclosure provides, in another aspect, a powered fastener driver. The gas spring-powered fastener driver includes a piston cylinder, a piston, a drive blade, a lifter, a storage chamber cylinder, a fill port, a one-piece fill valve, and an intermediate block. The piston is movable and is positioned within the piston cylinder. The drive blade is attached to the piston and is movable therewith between a top-dead-center position and a bottom-dead-center position. The lifter is operable to move the driver blade from a driven position corresponding with the bottom-dead-center position toward a ready position. The storage chamber cylinder encloses the piston cylinder and defines therewith a storage chamber in which compressed gas is stored. The fill port is coupled to the storage chamber cylinder and is in communication with the storage chamber. The fill port includes a stepped inner surface. The one-piece fill valve has a head, a body, and a receptacle. The one-piece fill valve is at least partially positioned within the fill port, and includes a slot which, in a closed state, prevents compressed gas in the storage chamber from being discharged to atmosphere through the fill valve and, in an open state, permits the storage chamber to be refilled with compressed gas through the fill valve. The intermediate block is configured to be pressed into the fill port adjacent the one-piece valve. The intermediate block has a cylindrical body and an axial stop projecting radially inwardly from the cylindrical body. The axial stop of the intermediate block is configured to inhibit removal of the fill valve from the fill port.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
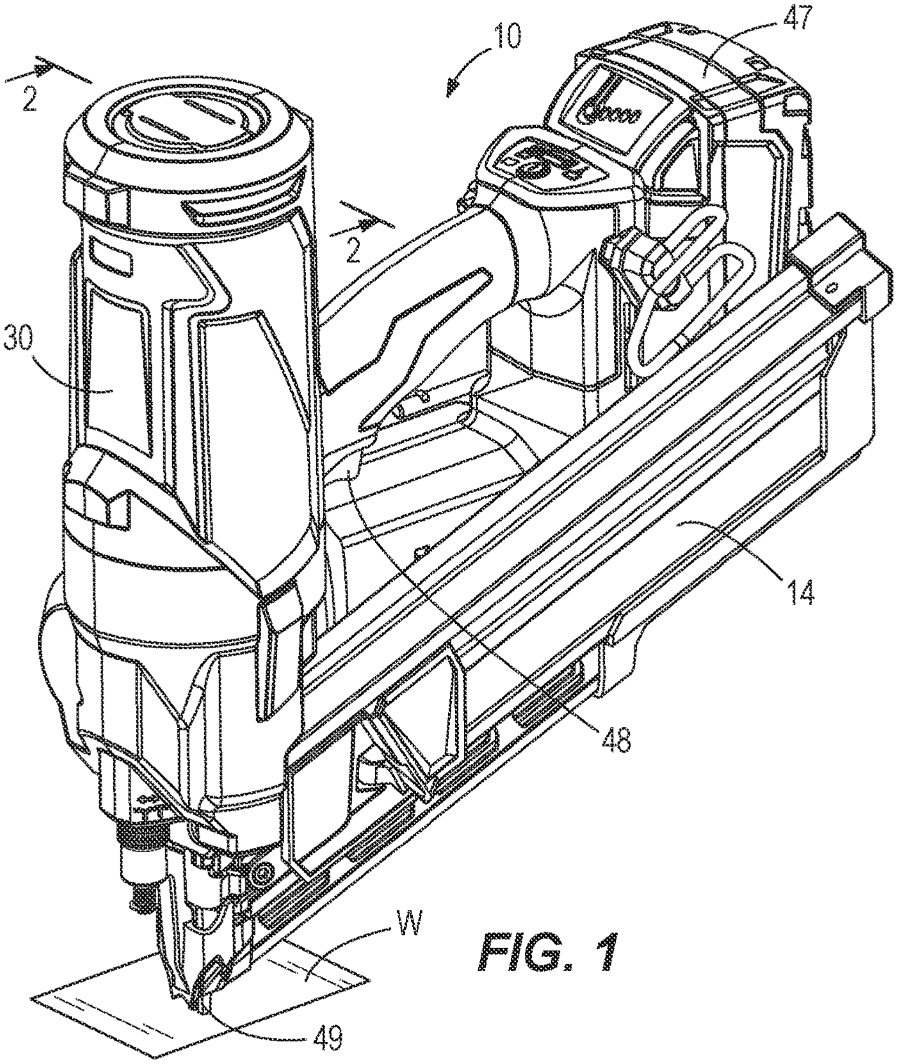
FIG. 1 is a perspective view of a gas spring-powered fastener driver.
Figure 2:
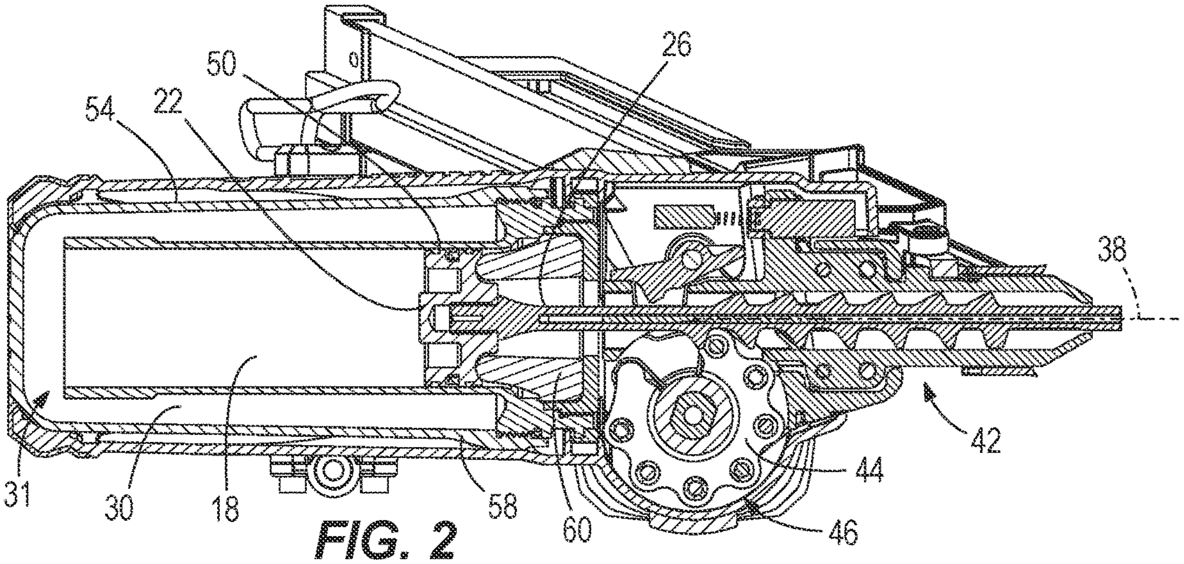
FIG. 2 is a cross-sectional view of the gas spring-powered fastener driver taken along section line 2-2 in FIG. 1.

With reference to FIG. 1, a gas spring-powered fastener driver 10 is operable to drive fasteners (e.g., nails, tacks, staples, etc.) held within a magazine 14 into a workpiece W. FIG. 2 illustrates some of the internal components of the fastener driver 10. The fastener driver 10 includes a piston cylinder 18 and a moveable drive piston 22 positioned within the piston cylinder 18 (FIG. 2). The fastener driver 10 further includes a driver blade 26 that is attached to the piston 22 and moveable therewith. During regular use, the fastener driver 10 does not require an external source of fluid (e.g., gas, air) pressure. Rather, the fastener driver 10 includes an outer storage chamber cylinder 30 of pressurized gas in communication with the piston cylinder 18. The outer storage chamber cylinder 30 defines a storage chamber 31 in which compressed gas is stored. The storage chamber 31 is in fluid communication with the piston cylinder 18. In the illustrated embodiment, the storage chamber cylinder 30 is coaxial with the piston cylinder 18, the drive piston 22, and the driver blade 26 along a driving axis 38. The piston 22 and thus the driver blade 26 are movable along the driving axis 38 between a bottom-dead-center (i.e., BDC) position (illustrated with piston 22, FIG. 3) and a top-dead-center (i.e., TDC) position (illustrated with piston 22*a*, FIG. 3).

With reference to FIG. 2, the cylinder 18 and the driver blade 26 define a driving axis 38 (FIG. 2). During a driving cycle, the driver blade 26 and the piston 22 are moveable between the top-dead-center (i.e., TDC) position and a driven or bottom-dead-center (BDC) position (piston 22, FIG. 3). The fastener driver 10 further includes a lifting assembly 42 (FIG. 2), which is powered by a motor 46, and which is operable to move the driver blade 26 from the driven position to the TDC position (piston 22, FIG. 3).

In operation, the lifting assembly 42 drives the piston 22 and the driver blade 26 toward the TDC position by energizing the motor 46. As the piston 22 and the driver blade 26 are driven toward the TDC position, the gas above the piston 22 and the gas within the storage chamber cylinder 30 is compressed. Prior to reaching the TDC position, the motor 46 is deactivated and the piston 22 and the driver blade 26 are held in a ready position, which is located between the TDC and the BDC or driven positions, until being released by user activation of a trigger 48 (FIG. 1). When released, the compressed gas above the piston 22 and within the storage chamber cylinder 30 drives the piston 22 and the driver blade 26 to the driven position, thereby driving a fastener into the workpiece. The illustrated fastener driver 10 therefore operates on a gas spring principle utilizing the lifting assembly 42 and the piston 22 to further compress the gas within the cylinder 18 and the storage chamber cylinder 30. Further detail regarding the structure and operation of the fastener driver 10 is provided below.

Figure 3:
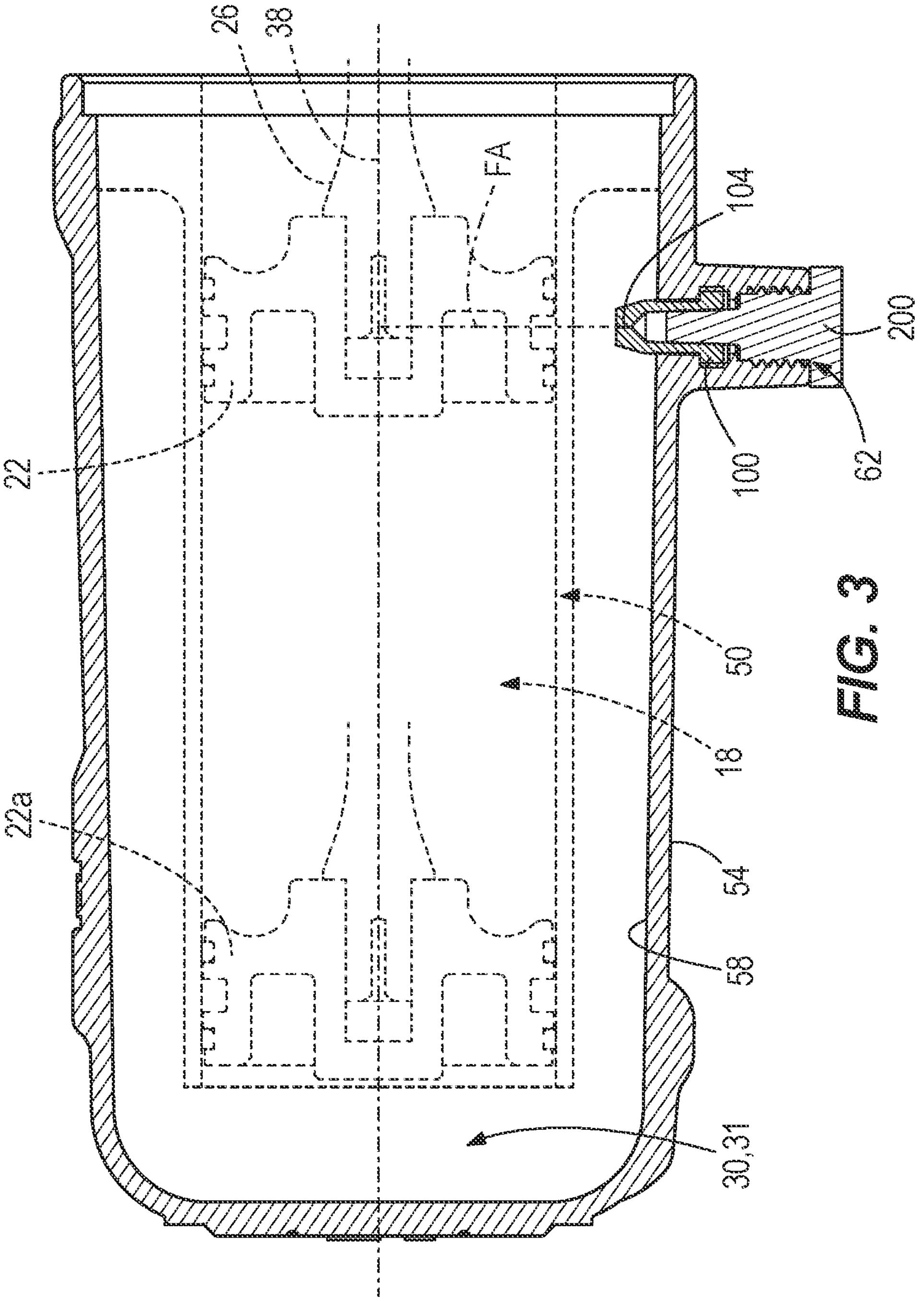
FIG. 3 is another cross-sectional view of the gas spring-powered fastener driver including a fill valve and a plug.

With reference to FIG. 3, the piston cylinder 18 has an annular inner wall (i.e., an inner side) 50 configured to guide the piston 22 along the driving axis 38. The outer storage chamber cylinder 30 has an annular outer wall (i.e., an outer side) 54 which faces away from the driving axis 38 and an opposite annular inner wall (i.e., an inner side) 58 which faces towards the driving axis 38. In the illustrated embodiment, the outer storage chamber cylinder 30 is metal. Other materials are possible.

Figure 4:
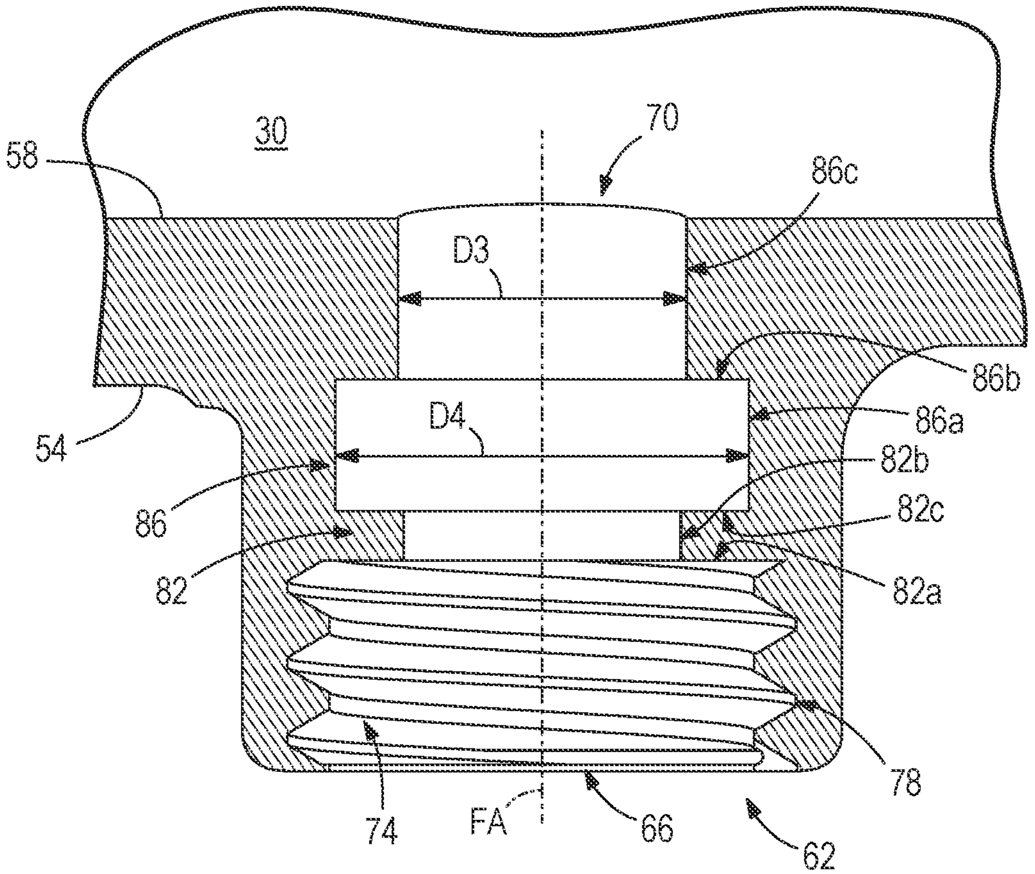
FIG. 4 is an enlarged view of a fill port of a storage chamber cylinder of the gas spring-powered fastener driver of FIG. 3.

FIG. 3 further illustrates the annular outer wall 54 and the annular inner wall 58 of the outer storage chamber cylinder 30. FIG. 3 also illustrates a fill port 62 within the outer storage chamber cylinder 30. The fill port 62 spans the annular outer wall 54 and the annular inner wall 58. The fill port 62 is most clearly illustrated in FIG. 4. As illustrated in FIG. 4, the fill port 62 includes an outer end 66 adjacent the annular outer wall 54 and an opposite inner end 70 adjacent the annular inner wall 58. As illustrated in FIG. 3, the fill port 62 is configured to receive the fill valve 100 therein. In the illustrated embodiment, the fill valve 100 may be made of an elastomer such as a natural rubber, a synthetic rubber, or the like. The fill valve 100 selectively permits compressed gas from a remote source (e.g., a compressed gas tank) to fill the outer storage chamber cylinder 30. A threaded plug 200 may selectively engage the fill port 62. The plug 200 may inhibit access to the fill valve 100 when the plug 200 engages the fill port 62. During a refilling operation, the plug 200 may be removed from the fill port 62, and a needle 300 (FIG. 15) can project through the fill port 62 and the fill valve 100. The needle 300 can then be connected to an external gas supply (e.g., the compressed gas tank) for introducing gas into the outer storage chamber cylinder 30. In the embodiment illustrated in FIG. 3, the fill port 62, plug 200, and fill valve 100 are each directed or oriented along a filling axis FA that is perpendicular to the driving axis 38.

Other elements may replace the needle 300 for introducing gas (i.e., pressure) into the outer storage chamber cylinder 30. For example, a check valve can otherwise apply pressure to the up-stream direction of the fill valve 100 (e.g., to introduce gas into the outer storage chamber cylinder 30). The needle 300 or check valve may also be used to relieve pressure from the outer storage chamber cylinder 30 to the environment of the fastener driver 10 (e.g., in a downstream direction). Once all gas is removed from the outer storage chamber cylinder 30, the fill valve 100 is configured to hold vacuum pressure of the outer storage chamber cylinder 30. In doing so, the fill valve 100 prevents ingress of gas into the outer storage chamber cylinder 30. In some embodiments, the fill valve 100 is operable to hold vacuum pressure by itself. In other embodiments (not shown), fill adapters may engage the fill valve 100 to hold vacuum pressure. The fill valve 100 of the illustrated embodiment is a one-piece fill valve 100. The fill valve 100 may also be described as a duckbill valve or a self-sealing valve. Operation and geometries of the one-piece fill valve 100 will be described in detail below.

The fill port 62 defines a passageway 74 (FIG. 4) extending from the outer end 66 to the inner end 70. The fill port 62 generally projects outwardly from the outer storage chamber cylinder 30. The inner end 70 is in fluid communication with the outer storage chamber cylinder 30. The fill port 62 includes a threaded portion 78 adjacent the outer end 66. The threaded portion 78 is provided as an interior surface within the fill port 62. The threaded portion 78 terminates adjacent an annular ring 82. The annular ring 82 has a first axial surface 82*a*, an annular surface 82*b*, and a second axial surface 82*c*. The first axial surface 82*a* is closer to the outer end 66 than the second axial surface 82*c*. The second axial surface 82*c* is closer to the inner end 70 than the first axial surface 82*a*. The annular surface 82*b* spans the first axial surface 82*a* and the second axial surface 82*c*. In the illustrated embodiment, the annular surface 82*b* has an inner diameter generally matching an inner diameter D3 of the second annular portion 86*c*. The second axial surface 82*c* abuts a conforming surface 86 of the fill port 62. The conforming surface 86 is shaped similarly to the fill valve 100. The conforming surface 86 includes a first annular portion 86*a*, a shoulder 86*b*, and a second annular portion 86*c*. The first annular portion 86*a* is located adjacent the second axial surface 82*c*. The second annular portion 86*c* terminates at the inner end 70. The illustrated first annular portion 86*a* has a diameter D4 larger than the diameter D3 of the second annular portion 86*c*. The fill port 62, the fill valve 100, and the conforming surface 86 may be otherwise shaped.

Figure 5:
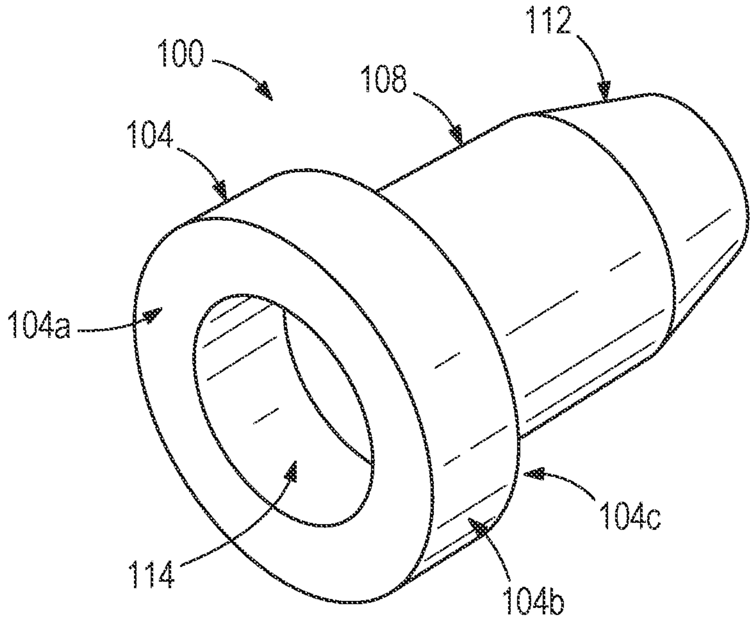
FIG. 5 is a perspective view of a fill valve configured for use with the storage chamber of FIG. 4.
Figure 6:
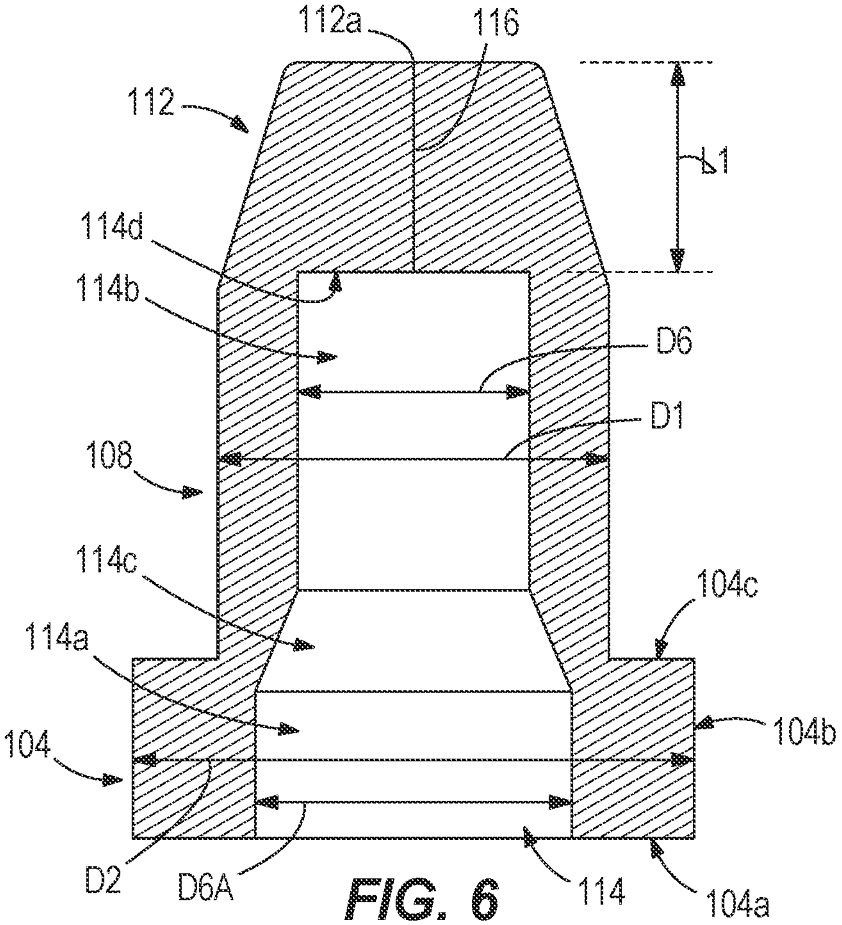
FIG. 6 is a cross-sectional view of the fill valve of FIG. 5.

FIGS. 5 and 6 illustrate the fill valve 100 in detail. The fill valve 100 includes a head portion 104 and a body portion 108 between the head portion 104 and a tip portion 112 thereof. The fill valve 100 includes a plug receptacle 114 configured to be engaged by the plug 200 (FIGS. 3, 9, 11, 13). The plug receptacle 114 can snugly secure the plug 200 to the fill port 62 such that access to the fill valve 100 is inhibited when the plug 200 engages the fill port 62. The fill valve 100 includes a slit 116 extending from the body portion 108 to a tip end 112*a* of the tip portion 112. The pressurized gas from the external gas supply passes through the needle 300 and through the slit 116 prior to entry within the outer storage chamber cylinder 30.

As shown in FIG. 6, the head portion 104 includes a first planar surface 104*a*, an annular outer surface 104*b*, and a second planar surface 104*c*. The annular outer surface 104*b* spans the first planar surface 104*a* and the second planar surface 104*c*. When the fill valve 100 is received in the fill port 62, the first planar surface 104*a* abuts the second axial surface 82*c* and the second planar surface 104*c* abuts the second annular portion 86*c*. Accordingly, during filling and/or refilling, axial force can be transmitted from the fill valve 100 to the fill port 62 while retaining the fill valve 100 in position. In some preferred embodiments, relative sizes of the annular outer surface 104*b* and the first annular portion 86*a* may be selected to permit axial movement or play of the head portion 104 within the first annular portion 86*a*. In these embodiments, the annular outer surface 104*b* may be nominally smaller than an axial length of the first annular portion 86*a* about the filling axis FA. In other embodiments, the relative sizes of the annular outer surface 104*b* and the first annular portion 86*a* may generally match one another to inhibit axial movement or play of the head portion 104 within the first annular portion 86*a*. In still other embodiments, the annular outer surface 104*b* may be dimensioned larger than the first annular portion 86*a* such that the head portion 104 must be compressed upon entry into the first annular portion 86*a*.

With reference to the fill valve 100 of FIGS. 5 and 6, the plug receptacle 114 is counter-sunk into the body portion 108. The plug receptacle 114 includes a first portion 114*a*, a second portion 114*b*, and a transition portion 114*c* between the first portion 114*a* and the second portion 114*b*. In the illustrated embodiment, both the first portion 114*a* and the second portion 114*b* are cylindrical in shape. The first portion 114*a* has an inner diameter D6A that is larger than an inner diameter D6 of the second portion 114*b* (e.g., the inner diameter D6 of the receptacle 114). The transition portion 114*c* transitions the first portion 114*a* to the second portion 114*b*. In the illustrated embodiment, the transition portion 114*c* is frustoconical and includes a linear taper between the inner diameter D6A and the inner diameter D6. In the embodiment of FIG. 6, the second portion 114*b* terminates, adjacent the tip portion 112, at a counterbore surface 114*d* in communication with the slit 116. The opposite end of the slit 116 is in communication with the tip end 112*a* of the tip portion 112. In the illustrated embodiment (FIG. 6), the counterbore surface 114*d* is substantially flat (e.g., perpendicular with the filling axis FA). In contrast, in other embodiments such as the fill valve 600 illustrated in FIG. 17, an angled (e.g., conical) countersunk surface 614*d* is adjacent the slit 616 (described in detail below).

With continued reference to the fill valve 100 of FIGS. 5 and 6, the slit 116 extends a length L1 between the plug receptacle 114 and the tip end 112*a* of the tip portion 112. In the illustrated embodiment, the length L1 is approximately 3 millimeters. Varying lengths of slits 116 may be employed depending on, for example, dimensions of the needle 300 (see FIG. 15 and discussion thereof below) and the operating pressure of the fastener driver (see Table 1 below). For example, in other embodiments, the length L1 of the slit 116 may be between 1 millimeter and 5 millimeters. In some embodiments, the length L1 of the slit 116 may be between 2 millimeters and 3 millimeters.

Figure 7:
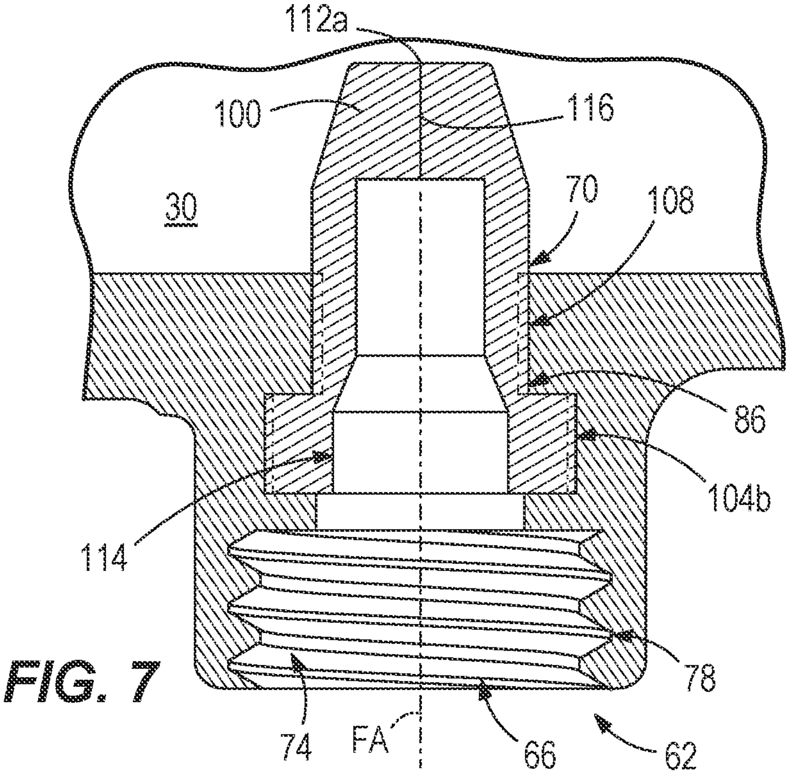
FIG. 7 is a cross-sectional view of the fill valve of FIG. 5 engaged with the fill port of FIG. 4.
Figure 9:
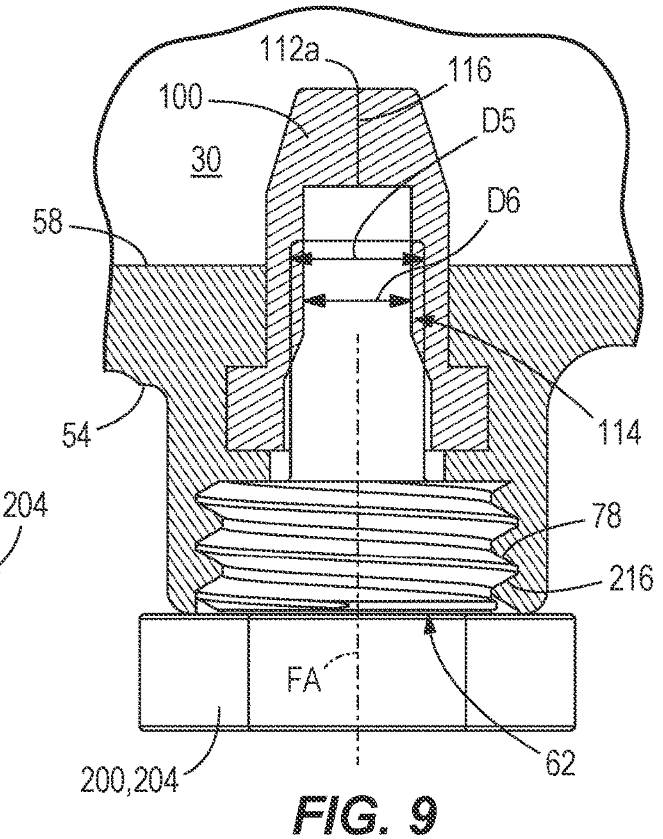
FIG. 9 is a cross-sectional view of the plug and the fill valve engaged with the fill port of FIG. 4.
Figure 10:
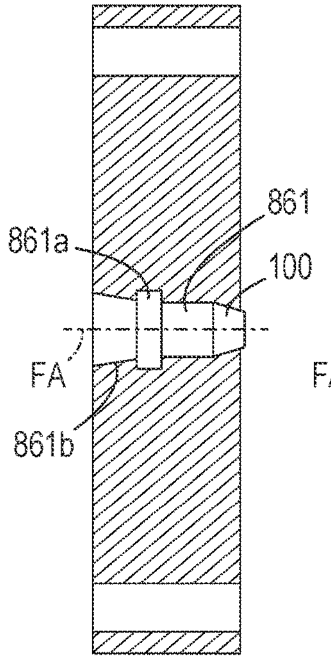
FIG. 10 is an alternate embodiment of a fill valve and a fill port.
Figure 11:
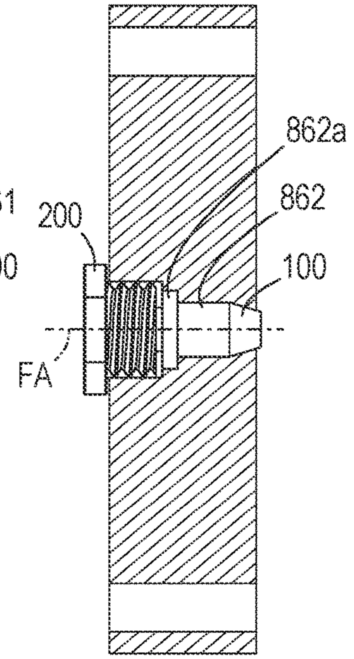
FIG. 11 is another alternate embodiment of a fill valve, a fill port, and a plug.
Figure 12:
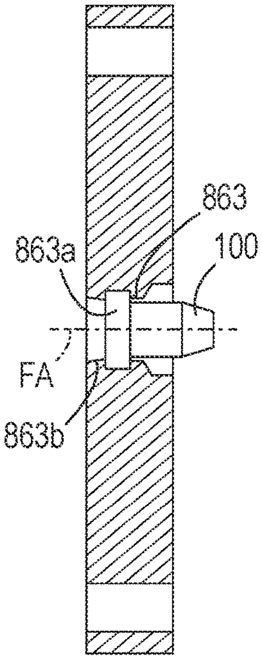
FIG. 12 is another alternate embodiment of a fill valve and a fill port.
Figure 13:
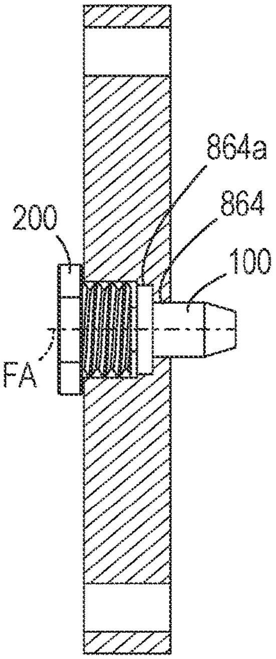
FIG. 13 is another alternate embodiment of a fill valve, a fill port, and a plug.

As best illustrated in FIG. 7, the fill valve 100 is slightly larger than the conforming surface 86. More specifically, the head portion 104 and the body portion 108, which are generally annularly shaped, have outer diameters D1, D2 (FIG. 6), respectively which are slightly larger than a corresponding inner diameters D3, D4 (FIG. 4) of the conforming surface 86. An outer diameter D2 of the head portion 104 (i.e., a head outer diameter D2) is larger than an outer diameter D1 of the body portion 108 (i.e., a body outer diameter D1). Additionally, when the fill valve 100 is fully seated in the conforming surface 86, at least the tip portion 112 of the fill valve 100 is received in the storage chamber cylinder 30. As illustrated in FIGS. 7 and 9, the entirety of the tip portion 112, and thus an entirety of the slit 116, may be positioned within the storage chamber cylinder 30 and beyond the inner end 70 of the fill port 62. In the illustrated embodiment, an entirety of the counterbore surface 114*d* is positioned within the bounds of the storage chamber cylinder 30 (i.e., above the inner end 70 as viewed in FIG. 70).

The illustrated fill valve 100 is made of an elastic material. The fill valve 100 may be made from rubber or another elastic and/or elastomeric material. Accordingly, the fill valve 100 can be press fit into position within the conforming surface 86. As a result of these interference fits, the annular outer surface 104*b* along with the outer surface of the body portion 108 create a dual radial seal for abutment against the fill port 62. Such a dual radial seal provides multiple surfaces with differing outer diameters for engaging the fill port 62. This strengthens the fill valve 100 itself and permits the fill valve 100 to hold high amounts of pressure within the outer storage chamber cylinder 30. In the illustrated embodiment, pressure within the outer storage chamber cylinder 30 is approximately 120 psi. For reference, some sporting balls are inflated at 6-8 psi.

Figure 8:
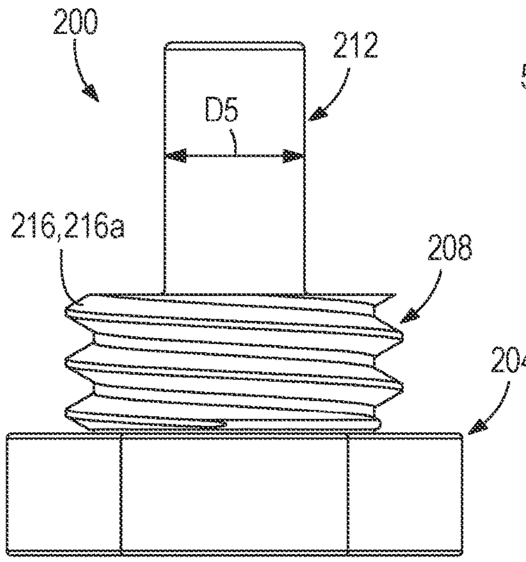
FIG. 8 is a cross-sectional view of a plug configured for use with the storage chamber of FIG. 4.
Figure 22B:
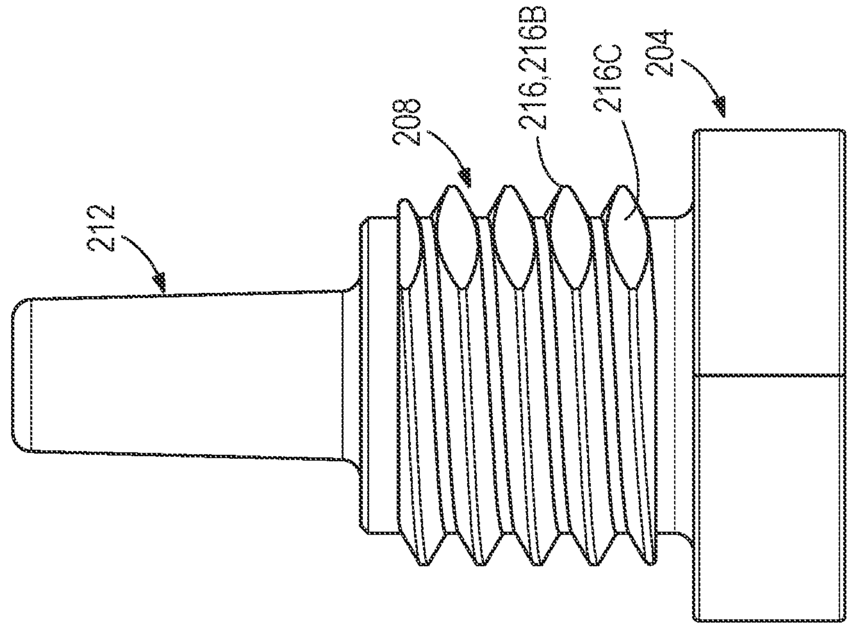
FIG. 22B is a side view of an alternate plug including interrupted threads.
Figure 22A:
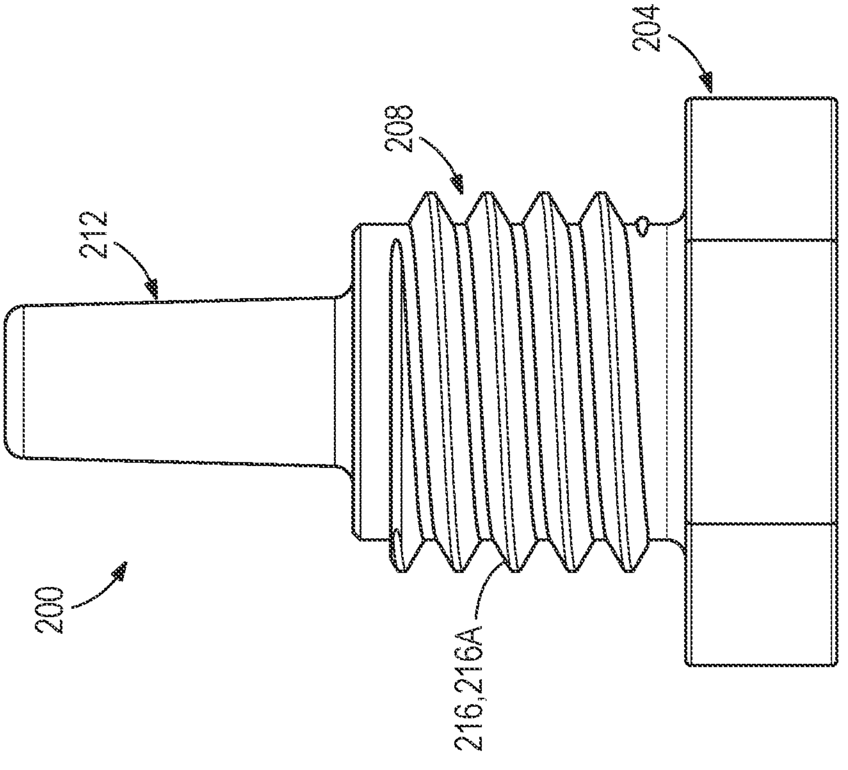
FIG. 22A is a side view of a plug including fully molded threads.

As shown in FIGS. 8 and 9, the plug 200 includes a head portion 204 and a body portion 208 between the head portion 204 and a tip portion 212 thereof. The head portion 204 is dimensioned (e.g., with a size larger than the fill port 62) to secure the plug 200 with the fill port 62. The body portion 208 includes threads 216 which are configured to engage the threaded portion 78 of the fill port 62. As illustrated in the embodiments of FIGS. 8 and 22A, the threads 216 may be fully molded threads 216A that extend around the entirety of the body portion 208 without interruption. In other embodiments, such as the embodiment illustrated in FIG. 22B, the threads 216 may be interrupted threads 216B that include flattened portions 216C, which interrupt the threads 216 from extending fully around the entirety of the body portion 208. In other embodiments, the body portion 208 may include any type of interrupted thread or threads 216B. For example, the body portion 208 may include threads 216 having helical gaps. FIG. 9 illustrates the plug 200 connected to the fill valve 100. In this position, the plug 200 is seated or stopped against the first axial surface 82*a* of the annular ring 82, and the first planar surface 104*a* of the head 104 of the fill valve 100 is seated (e.g., stopped) against the second axial surface 82*c* of the annular ring 82. With the plug 200 connected to the fill valve 100, the plug 200 inhibits air from within the storage chamber cylinder 30 from egress out of the fill valve 100 and to the surroundings of the fastener driver 10. The tip portion 212 has an outer diameter D5 (FIG. 8) nominally greater than the inner diameter D6 (FIG. 6) of the plug receptacle 114. In the illustrated embodiment, the tip portion 212 has a generally constant outer diameter D5. Accordingly, when the threads 216 of the plug 200 are threaded onto the threaded portion 78 of the fill port 62, the tip portion 212 presses against the plug receptacle 114, and the plug receptacle 114 expands to receive the tip portion 212. This interference fit promotes strong coupling between the plug 200 and the fill valve 100 during regular use (i.e., between filling and/or refilling operations) of the outer storage chamber cylinder 30.

FIGS. 10-13 illustrate a plurality of differently shaped interfaces having conforming surfaces 861-864 configured to receive the fill valve 100. The conforming surfaces 861, 863 of FIGS. 10 and 12 include shoulders 861*a*, 863*a*, which abut the head portions 104 of the fill valves 100 in FIGS. 10 and 12. This abutment axially retains the fill valve 100 in the fill port 62. The conforming surfaces 861, 863 each also include a frustoconical surface 861*b*, 863*b*. The frustoconical surfaces 861*b*, 863*b* permit alignment of the fill valve 100 along a filling axis FA. The frustoconical surfaces 861*b*, 863*b* provide surfaces for which the head portions 104 of the fill valves 100 to press upon during insertion of the fill valves 100 into the conforming surfaces 861, 863 prior to retention of the of the head portions 104 by the shoulders 861*a*, 863*b*. In contrast, the conforming surfaces 862, 864 of FIGS. 11 and 13 do not include shoulders. Rather, the conforming surfaces 862, 864 provide surfaces 862*a*, 864*a* onto which the annular outer surface 104*b* of the head portion 104 of the fill valve 100 can be pressed against. The conforming surfaces 862, 864 may require the plugs 200 to provide additional fixing force to retain the fill valves 100 therein.

Figure 14:
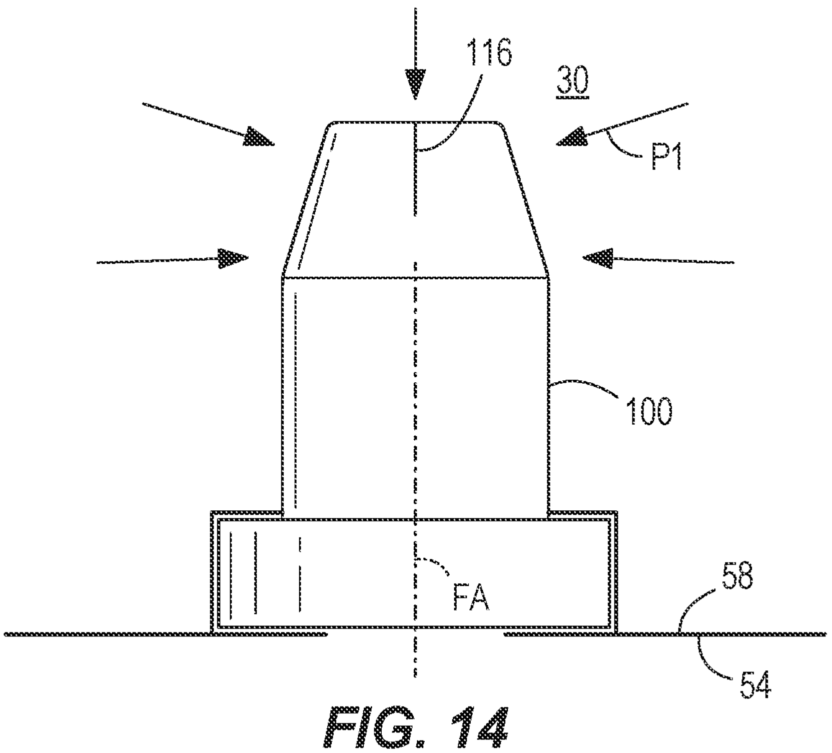
FIG. 14 is a schematic view of the fill valve inhibiting egress of pressure from within the outer storage chamber cylinder.
Figure 15:
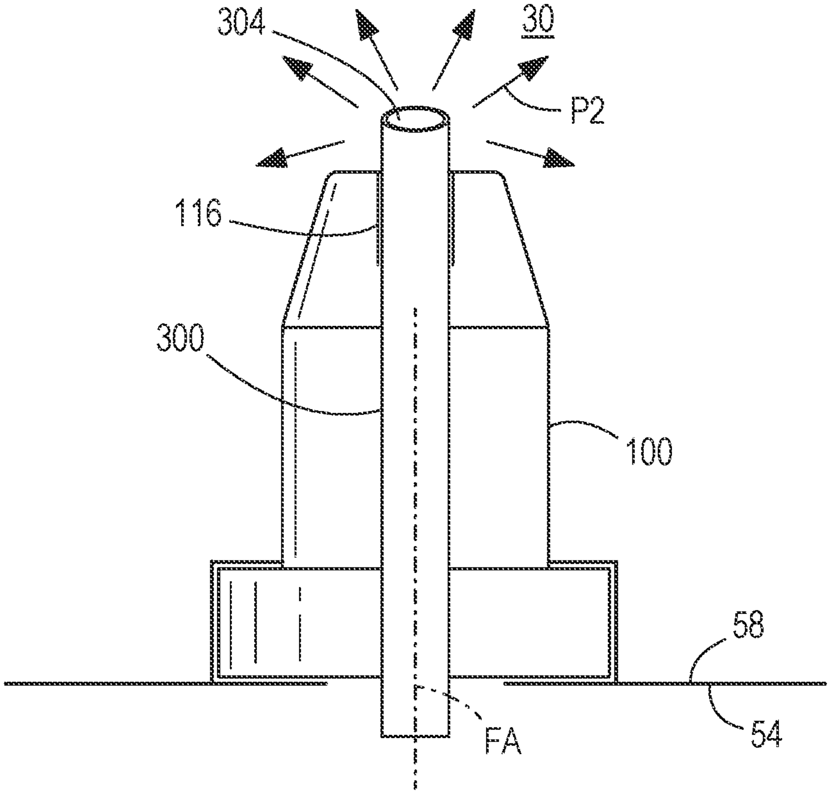
FIG. 15 is a schematic view of the fill valve permitting ingress of pressure from the surroundings of the fastener driver into the outer storage chamber cylinder.

A sequence of events occurs during a filling and/or refilling operation of the outer storage chamber cylinder 30. First, the fill valve 100 is positioned within the fill port 62 by inserting the fill valve 100 along the filling axis FA into position with the fill valve 100 engaging the conforming surface 86. This first step of positioning the fill valve 100 is done before initial filling of the outer storage chamber cylinder 30. In some embodiments, the fill valve 100 may be pressed into position within the fill port 62 without use of an additional tool. In other embodiments, a plunger tool (T, FIG. 23A) may be utilized to press the fill valve 100 into position within the fill port 62. During filling and/or refilling of the outer storage chamber cylinder 30, the needle 300 is moved along the filling axis FA with the needle 300 piercing the slit 116 such that a tip 304 of the needle 300 is received within the outer storage chamber cylinder 30 (see FIG. 15). The slit 116 is flexible such that the tip 304 of the needle 300 may pierce the slit 116. Once removed, the slit 116 may return to the closed position thereof (as illustrated in FIG. 14). While the tip 304 is received within the outer storage chamber cylinder 30, external gas is passed though the needle 300 and through the slit 116 of the fill valve 100 for entrance into the outer storage chamber cylinder 30. The external gas extends into the outer storage chamber cylinder 30 along arrows P2 (FIG. 15). Once the outer storage chamber cylinder 30 is adequately pressurized, the needle 300 is retracted along the filling axis FA. At this time, the pressure within the outer storage chamber cylinder 30 (illustrated as arrows P1, FIG. 14) closes the slit 116 and thus the fill valve 100. Optionally, the plug 200 is then inserted into the fill valve 100 with the tip portion 212 engaging the plug receptacle 114. The threads 216 are tightened on the threaded portion 78 of the fill port 62. The threads 216 hold the plug 200 and thus the fill valve 100 in the closed position. The fastener driver 10 is then ready for firing and operation of the lifting assembly 42.

Figure 16:
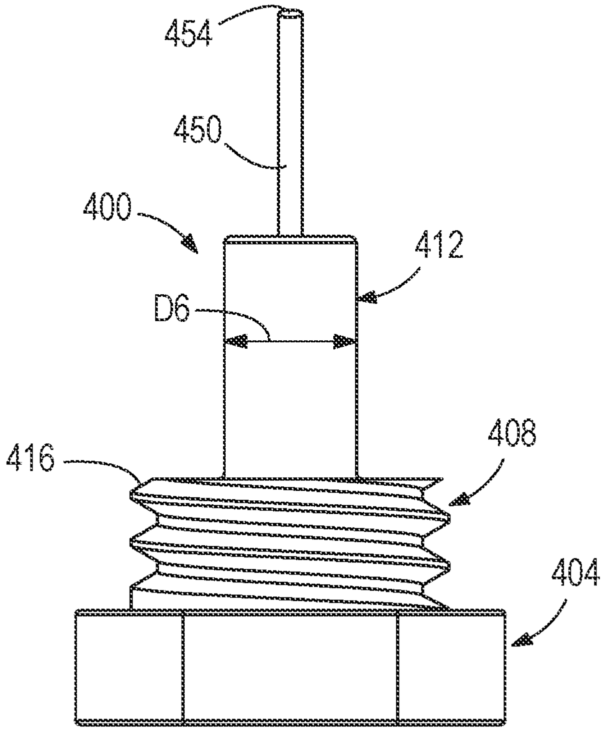
FIG. 16 is a schematic view of an adapter configured for use with the fill port of FIG. 4.

As illustrated in FIG. 16, in some other embodiments, an adapter 400 may be provided. The adapter 400 includes features similar to that of the plug 200 with reference numerals starting at 404. The adapter 400 further includes features similar to that of the needle 300 with reference numerals starting at 450. The adapter 400 can both pierce the slit 116 for positioning the tip 454 of the needle portion 450 within the outer storage chamber cylinder 30 as well as engaging the threaded portion 78 of the fill port 62 by the threads 416. With such an adapter 400, no seal is made between the adapter 400 and the fill port 62. Rather, during filling and/or refilling, with the tip 454 of the needle 450 positioned within the outer storage chamber cylinder 30, the pressure within the outer storage chamber cylinder 30 (represented by arrow P1, FIG. 14) forms a seal against the fill valve 100. This forms the seal to inhibit leakage of compressed gas from leaking in an outward direction from the outer storage chamber cylinder 30 through the fill valve 100 and the adapter 400, to the surroundings of the fastener driver 10.

Figure 17:
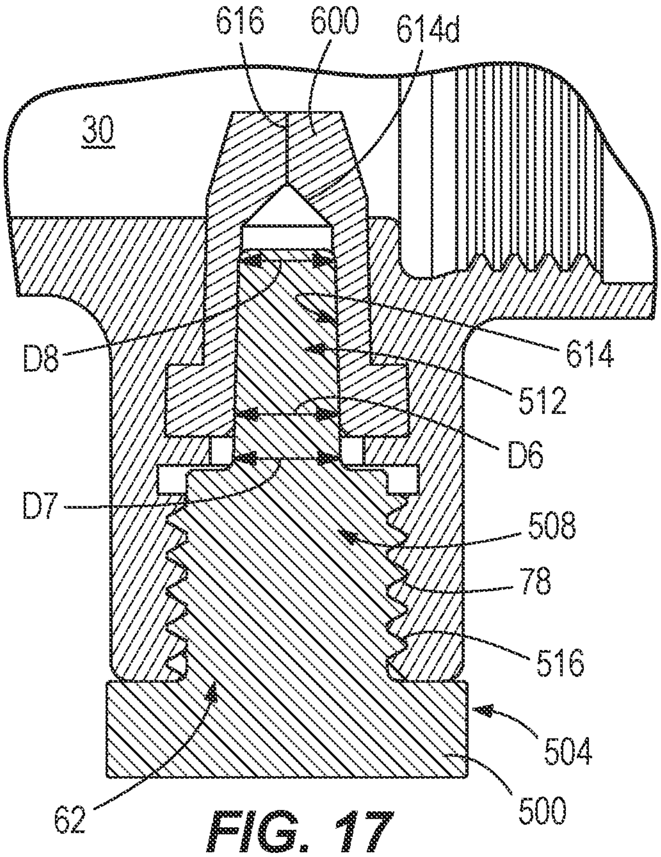
FIG. 17 is a cross-sectional view of another fill valve and plug configured for use with the storage chamber of FIG. 4

FIG. 17 illustrates another plug 500 configured for use with a fill valve 600 and the storage chamber cylinder 30. The fill valve 600 is similar to the fill valve 100 except the plug receptacle 614 of the fill valve 600 is dimensioned to receive the plug 500. Similar components of the fill valve 600 when compared to the fill valve 100, such as the slit 616 are numbered with '600' series reference numerals. The plug 500 includes a head portion 504, a body portion 508 between the head portion 504 and a tip portion 512 thereof. The head portion 504 is dimensioned to interconnect the tip 512 and the fill valve 600 such that the outer storage chamber cylinder 30 is sealed from the surroundings by the closing of the slit 616 as well as the interconnection between the tip 512 and the plug receptacle 614 of the fill valve 600. The body portion 512 includes threads 516 which are configured to engage the threaded portion 78 of the fill port 62. The plug 500 differs from the plug 200 (FIG. 8). As mentioned above, the plug 200 has a generally constant outer diameter D5. The fill valve 600 has a generally constant inner diameter D6 which is configured to interfere with the plug 500. The tip portion 512 of the plug 500 has a variable outer diameter. As illustrated in FIG. 17, the plug 500 has a base diameter D7 which is greater than a tip diameter D8 thereof. In the illustrated embodiment, the tip portion 512 of the plug 500 has a linearly tapered outer diameter. Other variable outer diameters of the tip portion 512 are possible, such as non-linearly tapering outer diameters. Otherwise shaped tip portions 512 (e.g., constant diameter, non-constant diameter, otherwise tapered tip portions 512) are also possible.

Upon insertion of the plug 500 into the fill port 62 and into engagement with the fill valve 600, the tip portion 512 of the plug 500 is inserted at least partially into the plug receptacle 614. The tapered outer diameter of the tip portion 512 promotes concentric alignment of the plug 500 relative to the fill valve 600. As with the fill valve 100 and the plug 200, once the plug 500 is seated in engagement with the fill valve 600 (e.g., when the plug 500 is installed to the fill valve 600), egress of gas from the outer storage chamber cylinder 30 is inhibited.

Figure 18A:
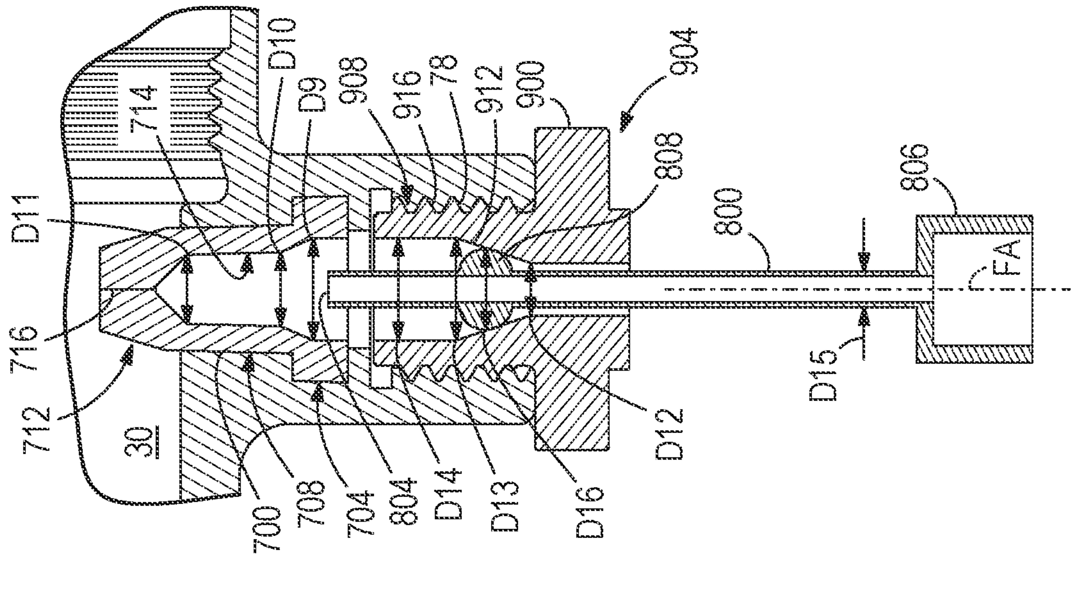
FIG. 18A is a cross-sectional view of the fill valve, needle, and adapter with the needle positioned within the adapter.
Figure 18B:
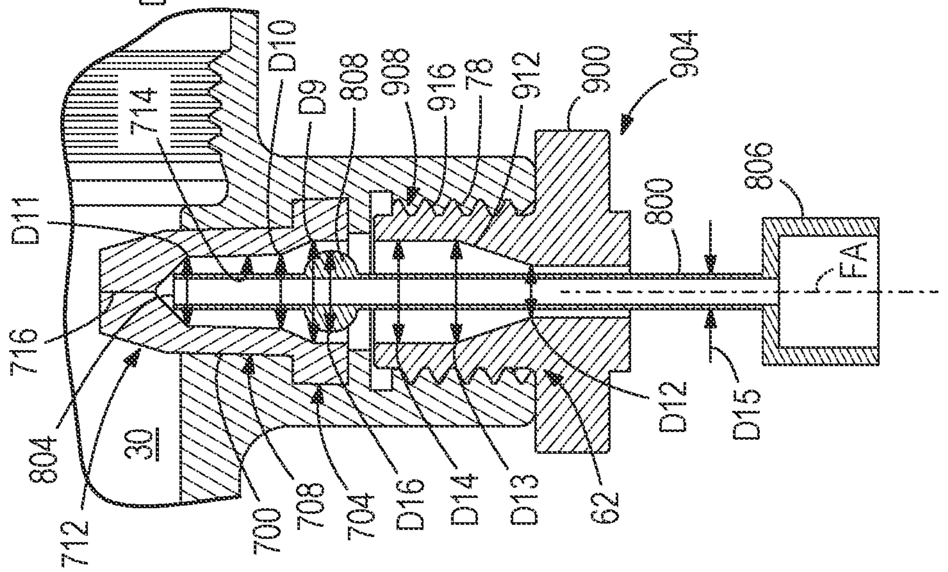
FIG. 18B is another cross-sectional view of the fill valve, needle, and adapter of FIG. 18A with the needle advanced into the fill valve.
Figure 18C:
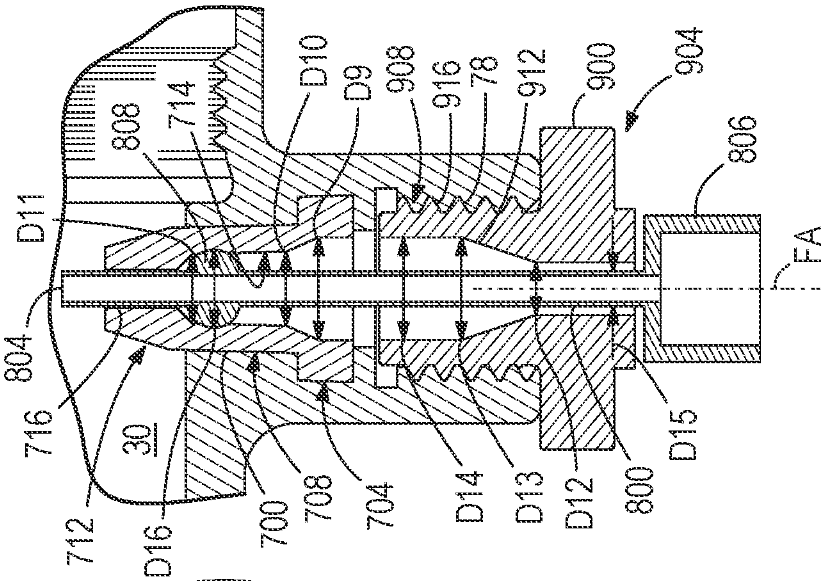
FIG. 18C is another cross-sectional view of the fill valve, needle, and adapter of FIG. 18A with the needle advanced into the storage chamber.

FIGS. 18A-18C illustrate another fill valve 700, needle 800, and an adapter 900 configured for use with the storage chamber cylinder 30. More specifically, FIGS. 18A-18C illustrate an insertion process of the needle 800 into engagement with the fill valve 700 for providing gas to the storage chamber cylinder 30 while maintaining at least one seal to inhibit egress of gas from the storage chamber cylinder 30. With reference to FIG. 18A, the fill valve 700 includes a head portion 704 and a body portion 708 between the head portion 704 and a tip portion 712 thereof. The fill valve 700 includes a receptacle 714 configured to be receive the needle 800. The plug receptacle 714 has a base inner diameter D9 adjacent the head portion 704, an intermediate inner diameter D10 adjacent the body portion 708, and a tip inner diameter D11 adjacent the tip portion 712. The tip inner diameter D11 converges to a slit 716 of the fill valve 700.

The receptacle 714 of the fill valve 700 is defined by the inner diameters D9-D11. In the illustrated embodiment, the base inner diameter D9 is greater than the intermediate inner diameter D10 and the tip inner diameter D11. In the illustrated embodiment, the intermediate inner diameter D10 is approximately the same size as the tip inner diameter D11. Approximately meaning within +/−20%. In other embodiments, the intermediate inner diameter D10 may be within +/−50% from the tip inner diameter D11. Other ratios of the intermediate inner diameter D10 and the inner diameter D11 are possible. In the illustrated embodiment, the receptacle 714 of the fill valve 700 has a rectilinearly tapered inner diameter which is defined by the inner diameters D9-D11. Such a taper is configured to guide the needle 800 into alignment with the filling axis FA, and thus the slit 716 of the fill valve 700. Other variable inner diameters of the needle receptacles 714 are possible, such as linearly tapering inner diameters and non-linearly tapering (e.g., curved) inner diameters.

The adapter 900 includes a base 904 and a body 908. The base 904 protrudes radially outwardly from the body 908. The base 904 and the body 908 together define a cavity 912 configured to receive the needle 800. The cavity 912 has a base inner diameter D12 adjacent the base 904, an intermediate inner diameter D13 adjacent the body 908, and a tip inner diameter D14 furthest away from the base 904. The tip inner diameter D14 of the adapter 900 is dimensioned with approximately the same size as base inner diameter D9 of the fill valve 700. Approximately meaning within +/−20%. In other embodiments, the tip inner diameter D14 may be within +/−50% from the base inner diameter D9. Other ratios of the tip inner diameter D14 and the base inner diameter D9 are possible. In the illustrated embodiment, the cavity 912 is flared between the base inner diameter D12 and the tip inner diameter D14. The illustrated cavity 912 varies in diameter along the filling axis FA. The illustrated cavity 912 varies in diameter in a non-linear manner along the filling axis FA (e.g., the cavity 912 is generally conical). The cavity 912 may be otherwise shaped.

The adapter 900 further includes threads 916 on the body 908 thereof. The threads 916 are configured to engage the threaded portion 78 to secure the adapter 900 in position relative to the fill valve 700 and the storage chamber cylinder 30. The head portion 704 of the fill valve 700 is dimensioned in a similar fashion to the head portion 104 of the fill valve 100 such that the head portion 704 can secure the fill valve 700 to the conforming surface 86 of the fill port 62 (See FIG. 7). In the embodiment illustrated in FIG. 18A, the threads 916 extend the entire length of the body 908 in a direction parallel to the longitudinal axis LA, and the threads 916 engage the entirety of the threaded portion 78. In other embodiments, the threads 916 may be positioned on greater than half of the body 908 and engage greater than half of the threaded portion 78. In other embodiments, the threads 916 may be positioned on other amounts of the body 908, and engage differing proportions of the threaded portion 78.

The needle 800 includes a tip 804 and a base 806. Between the tip 804 and the base 806, the needle 800 has a cylindrical outer diameter D15. The needle 800 further includes, between the tip 804 and the base 806, a projection 808 (i.e., a ball). The projection 808 has an outer diameter D16 greater than the cylindrical outer diameter D15 of the remainder of the needle 800. In the illustrated embodiment, the projection 808 is generally annularly shaped, and projects from the needle 800 away (e.g., radially outwardly) from the filling axis FA. In the illustrated embodiment, the projection 808 has a rounded (e.g., curved) annular shape.

As a result of the relative sizes of the diameters D9-D16, during insertion and removal of the needle 800 from the fill valve 700 and the adapter 900, the projection 808 may function to seal the outer storage chamber cylinder 30 from the surroundings. The outer diameter D16 is greater than the base inner diameter D12. The outer diameter D16 is greater than the tip inner diameter D11. Accordingly, the adapter 900 may serve to align the needle 800 along the filling axis FA during insertion of the needle 800.

The cylindrical outer diameter D15 is smaller than the base inner diameter D12, the intermediate inner diameter D13, and the tip inner diameter D14. The cylindrical outer diameter D15 is also smaller than the base inner diameter D9, the intermediate inner diameter D10, and the tip inner diameter D11. The cylindrical outer diameter D15 is smaller than a largest flexible extent of the slit 716. Accordingly, the needle 800 can pass through the cavity 912 and the receptacle 714 to pierce the slit 716 with the slit 716 forming a seal against the tip 804 thereof in the installed position (FIG. 18C).

The outer diameter D16 is greater than the tip inner diameter D11. Optionally, the outer diameter D16 is greater than the intermediate inner diameter D10. Accordingly, when the needle 800 is installed (FIG. 18C) with the tip 804 projecting into the outer storage chamber cylinder 30, the projection 808 may press against the fill valve 700 and function as a secondary seal in addition to the slit 716. This secondary seal may function during insertion and removal of the needle 800 relative to the fill valve 700. Accordingly, the projection 808 may maintain a seal between the outer storage chamber cylinder 30 and the surroundings as the slit 716 transitions between open (FIG. 18C) and closed positions (FIGS. 18A-18B) thereof.

FIG. 18A illustrates a first position (e.g., a retracted position) of the needle 800 in contact with the adapter 900. In this position, the tip 804 is received in the plug receptacle 714 of the fill valve 700. However, the remainder of the needle 800, including the projection 808 is not yet positioned in the plug receptacle 114. As illustrated in the first position of FIG. 18, the projection 808 is seated against the cavity 912. In this position, the projection 808 and the cavity 912 continue to align the needle 800 with the filling axis FA.

Upon further application of force to the needle 800, the projection 808 progresses to the position illustrated in FIG. 18B (e.g., a second position, intermediate position) in which the projection 808 is removed from the cavity 912, and the projection 808 is partially positioned within the receptacle 714. In this position, the tip 804 of the needle 800 contacts the tip portion 712 of the fill valve 700.

Upon further application of force to the needle 800, the tip 804 of the needle 800 progresses to pierce the slit 716 and to the position illustrated in FIG. 18C with the tip 804 located within the chamber cylinder 30. In this position, (e.g., a third position, a fully inserted position) the projection 808 may press against the tip portion 712 of the fill valve 700 to inhibit further insertion of the needle 800 into the chamber cylinder 30. The base 806 of the needle 800 may also contact the base 904 of the adapter 900. In this position, gas may be passed through the needle 800 and into the chamber cylinder 30.

During removal of the needle 800 from the fully inserted position with the tip 804 thereof positioned in the chamber cylinder 30, the reverse process is carried out. The needle 800 is retracted along the filling axis FA in reverse of the above-described insertion thereof. As illustrated in FIG. 18D, the projection 808 contacts the fill valve 700 when the needle 800 is fully seated upon the fill valve 700. The projection 808 continues to press against the fill valve 700 during retraction of the needle 800 to the position of FIG. 18B. As the tip 804 of the needle 800 cracks the slit 716 during retraction, the projection 808 maintains the seal with the fill valve 700. Accordingly, the slit 716 can re-seal itself before the projection 808 is removed from contact with the fill valve 700 (e.g., as in the position of FIG. 18B).

Figure 19C:
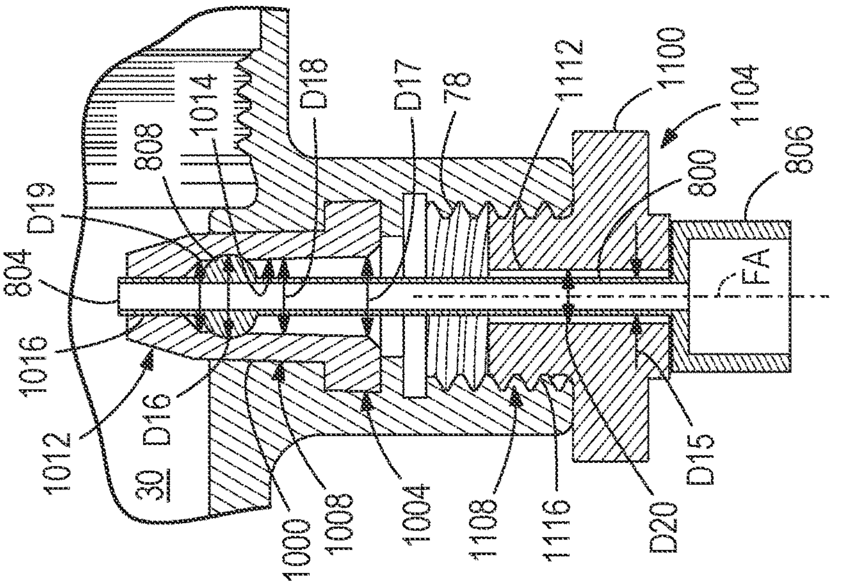
FIG. 19C is another cross-sectional view of the fill valve, needle, and adapter of FIG. 19C with the needle advanced into the fill valve.
Figure 19B:
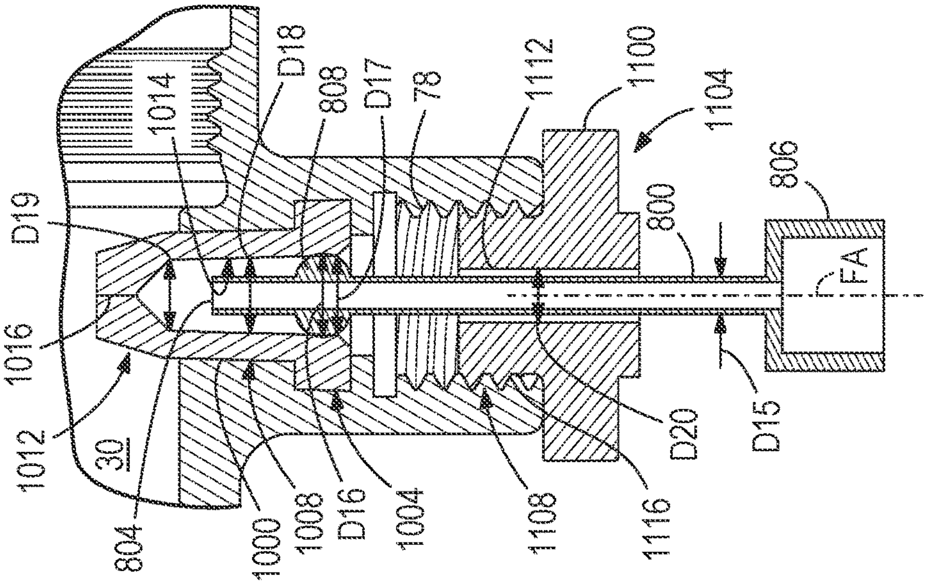
FIG. 19B is another cross-sectional view of the fill valve, needle, and adapter of FIG. 19A with the needle advanced into the fill valve.
Figure 19A:
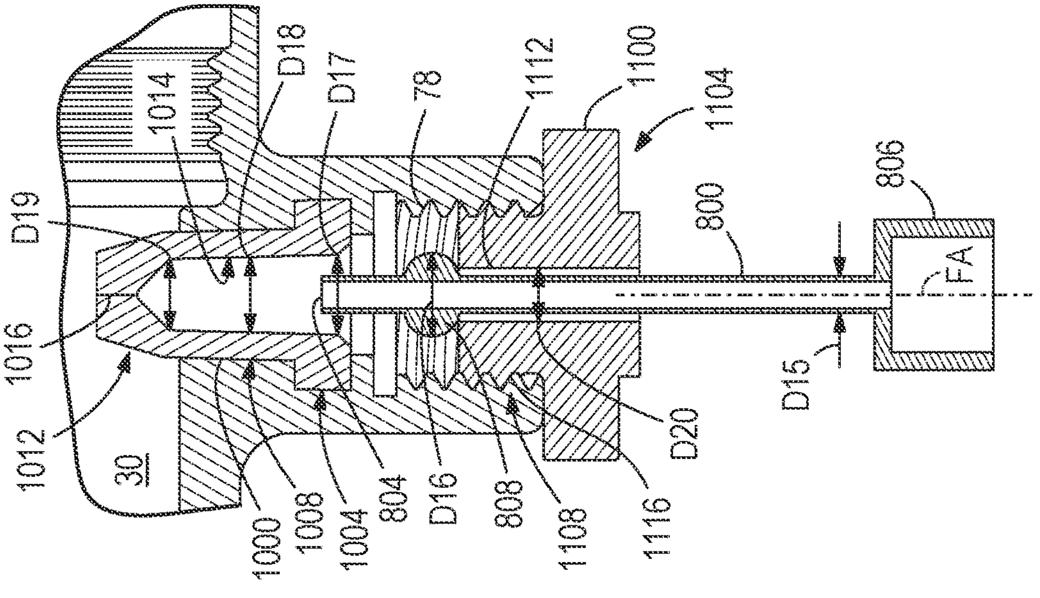
FIG. 19A is a cross-sectional view of another fill valve, needle, and adapter with the needle positioned within the adapter.

FIGS. 19A-19C illustrate another fill valve 1000, the needle 800, and another adapter 1100 configured for use with the storage chamber cylinder 30. More specifically, FIGS. 19A-19C illustrate an insertion process of the needle 800 into engagement with the fill valve 1000 for providing gas to the storage chamber cylinder 30 while maintaining at least one seal to inhibit egress of gas from the storage chamber cylinder. The fill valve 1000, needle 800, and adapter 1100 function similarly to the fill valve 70, needle 800, and adapter 1000 described above.

The fill valve 1000 is differently shaped than the fill valve 700. The fill valve 1000 generally includes features similarly to the fill valve 700 and including reference numerals in the 1000 series. The fill valve 1000 is defined by inner diameters D17-D19. In the illustrated embodiment, a base inner diameter D17 is slightly greater than an intermediate inner diameter D18 and a tip inner diameter D19. The base inner diameter D17 may be between 1% and 50% larger than the tip inner diameter D19. In the illustrated embodiment, the base inner diameter D17 is approximately 10% larger than the tip inner diameter D19. In the illustrated embodiment, the base inner diameter D17 linearly increases along the filling axis FA with the intermediate inner diameter D18 being proportionally between the size of the base inner diameter D17 and the tip inner diameter D19. The inner diameters D17-D19 define a receptacle 1014 of the fill valve 1000 similar to the receptacle 714 of the fill valve 700. Other variable inner diameters of the needle receptacle 1014 are possible, such as rectilinearly tapering inner diameters and non-linearly tapering (e.g., curved) inner diameters.

The adapter 1100 is differently shaped than the adapter 900. The adapter 1100 includes a base 1104 and a body 1108. The base 1104 protrudes radially outwardly from the body 1108. The base 1104 and the body 1108 together define a through bore 1112 configured to receive the needle 800. The illustrated through bore 1112 is linear and extends parallel to the filling axis FA when the adapter 1100 is secured to the storage chamber cylinder 30. The through bore 1112 has a diameter D20 which is constant in size along the filling axis FA when the adapter 1100 is secured to the storage chamber cylinder 30. The diameter D12 of the through bore 1112 is greater than the outer diameter D15 of the needle 800, and less than the outer diameter D16 of the projection 808. In the illustrated embodiment, the needle 800 is a 16-gauge needle having a nominal outer diameter D15 of approximately 1.27 millimeters. Other sized needles 800 are possible. In some embodiments, the projection 808 may be a bead affixed to the needle 800 after the adapter 1100 is seated against the base 806. In the illustrated embodiment, the projection 808 is a steel bead affixed to the needle 800 with ethyl cyanoacrylate (e.g., CA glue, commonly known as "super glue"). In other embodiments, the projection 808 may be fixed in other ways (e.g., welded) to the needle 800. Accordingly, the projection 808 may inhibit removal of the adapter 1100 from the needle 800. Accordingly, the needle 800 may be inhibited from removal from the adapter 1100 when the adapter is secured to the storage chamber cylinder 30. The adapter 1100 includes other features similar to the adapter 900 but with reference numerals in the 1100 series.

When secured to the storage chamber cylinder 30, the adapter 1100 may extend a lesser extent along the filling axis FA when compared to the adapter 900. In other words, the body 1108 of the adapter 1100 is axially shorter than the body 908 of the adapter 900. Accordingly, less threads 1116 are required on the body 1108 when compared to the threads 916 of the body 908. In the illustrated embodiment, the threads 1116 extend the entirety of the body 1108. However, the body 1108 is shorter than the body 908. The threads 1116 may extend other (e.g., partial) lengths relative to the body 1108. It is understood that the axial length of the threaded portion 78 parallel to the longitudinal axis LA may be adjusted in accordance with axial lengths of the adapter 1100, fill valve 1000, and needle 800 to permit the described sealing functions of the projection 808.

The fill valve 1000, needle 800, and adapter 1100 function similarly to the fill valve 700, the needle 800, and the adapter 900. As illustrated in FIG. 19A, the projection 808 of the needle 800 may rest against the through bore 1012 of the adapter 1100 in a first position (e.g., retracted position) to inhibit removal of the needle 800 from the adapter 1100. In the illustrated embodiment, the projection 808, having a diameter D16 larger than the diameter D20 of the through bore 1112, is inhibited from being positioned within the through bore 1112.

After receiving an application of force, the needle 800 progresses to the position illustrated in FIG. 19B (e.g., a second position, intermediate position) in which the projection 808 is removed from the through bore 1012, and the projection 808 is partially received within a receptacle 1014 of the fill valve 1000. In this position, the projection 808 presses against the receptacle 1014 of the fill valve 1000 to provide a secondary seal along with a slit 1016 of the fill valve 1000 for inhibiting passage of gas into and out of the chamber cylinder 30.

Upon further application of force, the needle 800 pierces the slit 1016 of the fill valve 1000, and the tip 804 is located in the chamber cylinder 30. The needle 800 is then positioned in the third position (e.g., a fully inserted position) wherein gas may be passed through the needle 800 and into the chamber cylinder 30.

Dependent on the type of fastener driver 10, differing amounts of gas may be transferred through the needle 800 and into the chamber cylinder 30 to achieve the desired pressure within the chamber cylinder 30. Table 1 below identifies example filling pressures for various fastener drivers 10 having chamber cylinders 30 with the piston 22 in the bottom-dead-center (i.e., BDC) position (illustrated with piston 22, FIG. 3) or the top-dead-center (i.e., TDC) position (illustrated with piston 22*a*, FIG. 3). Other fill pressures of the chamber cylinders 30 are possible.

TABLE 1

Fill Pressure of Chamber Cylinder 30 for Various Fastener Drivers

| | 23ga Pin Nailer | 18ga Finish Nailer | Narrow Crown Stapler | 16ga Finish Nailer | 15ga Finish Nailer | Framing Nailer | Utility Stapler |
|---|---|---|---|---|---|---|---|
| BDC Pressure [psi] | 70 | 56.3 | 85 5 | 64 | 78 | 102 | 112 |
| TDC Pressure [psi] | 111 | 84.5 | 127.5 | 110.7 | 153 | 164 | 181 |

It is envisioned that overfill protection may be employed to inhibit overfilling of the chamber cylinder 30 beyond the above-identified filling pressures in Table 1. In some embodiments, an operator may repeatedly introduce gas through the needle 800 and into the chamber cylinder 30 while periodically measuring gas pressure within the chamber cylinder 30. If the filling pressure is exceeded, excess gas may be release from the chamber cylinder 30. In other embodiments, between the external source of air pressure and the needle 800, an overfill prevention valve (not shown) may inhibit further passage of compressed air upon reaching the desired fill pressure. In some embodiments, the overfill prevention valve may be adjustable such that an operator may adjust the overfill prevention valve before use in filling any one of the varieties of the fastener drivers 10 listed in Table 1.

During removal of the needle 800 from the fully inserted position with the tip 804 thereof positioned in the chamber cylinder 30, the needle 800 is retracted along the filling axis FA. The projection 808 continues to press against the fill valve 1000 during retraction of the needle 800 to the intermediate position of FIG. 19B. Upon further retraction to the first position of FIG. 19A (e.g., the retracted position), the slit 1016 is closed. Upon further retraction to the first position of FIG. 19A (e.g., the retracted position), the projection 808 no longer contacts the fill valve 1000. In other words, as the tip 804 cracks the slit 1016 during retraction, the projection 808 maintains the seal with the fill valve 1000. Accordingly, the slit 1016 can re-seal itself before the projection 808 is removed from contact with the fill valve 1000 (e.g., as in the position of FIG. 19A)

Figure 20B:
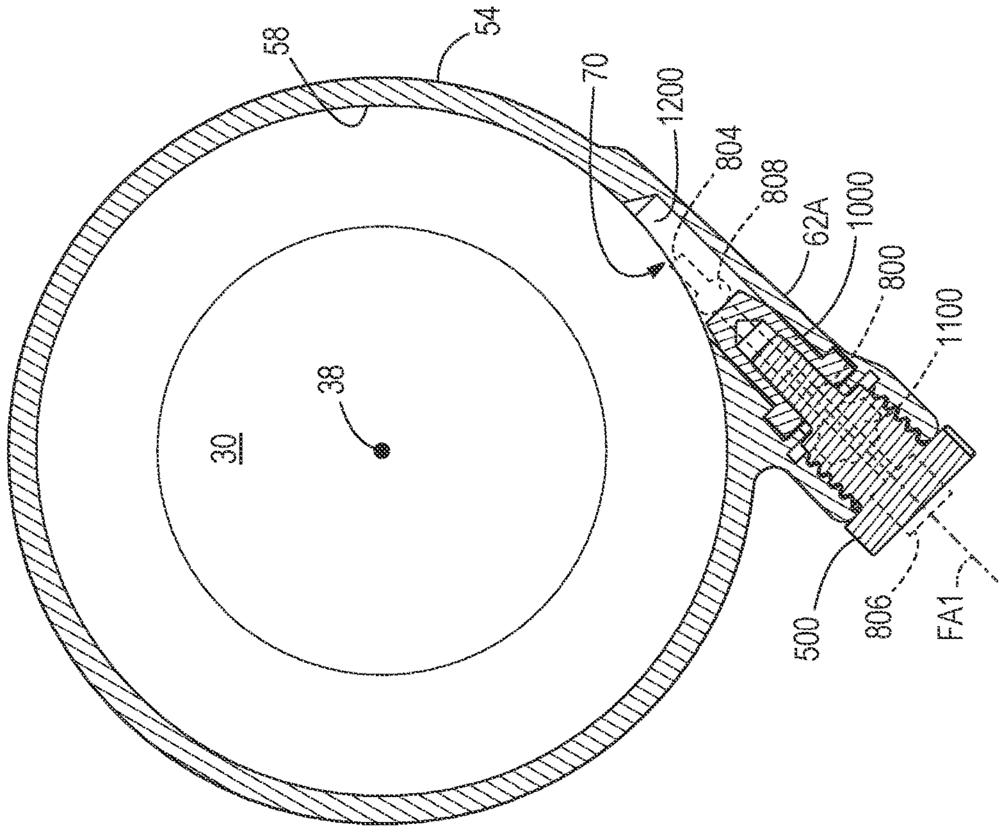
FIG. 20B is a cross-sectional view of the fill valve and adapter of FIG. 20A.
Figure 20A:
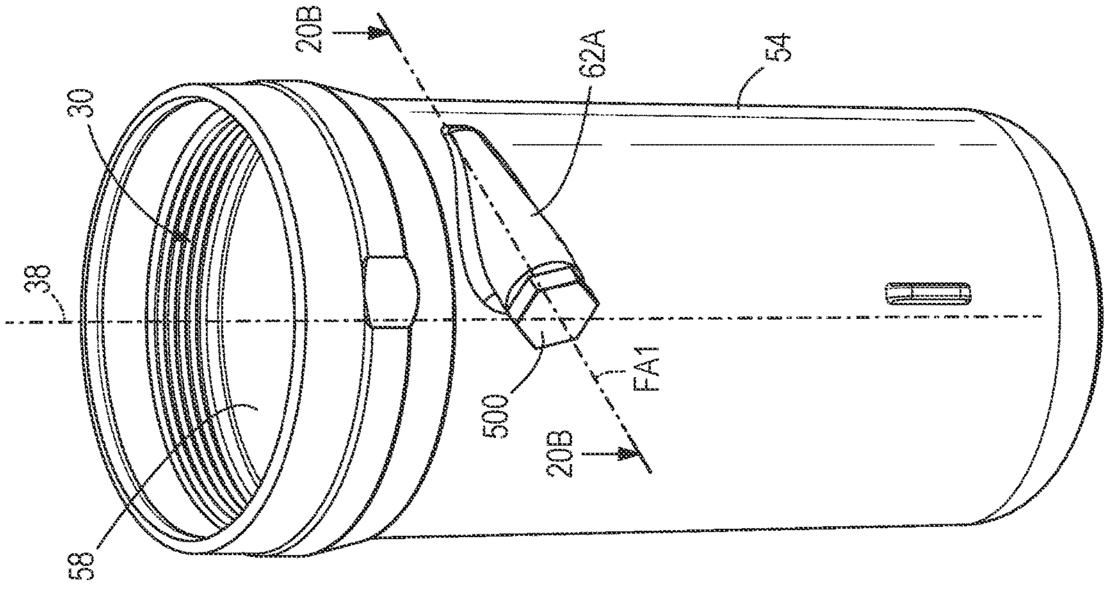
FIG. 20A is a perspective view of a fill valve and an adapter extending transverse to a driving axis of a storage chamber cylinder.

Various embodiments and arrangements of the needle 800, fill valve 1000, and adapter 1100 are possible. For example, as illustrated in FIGS. 20A-20B, a fill port 62A may extend along a filling axis FA1 that is offset from the driving axis 38. As shown in FIG. 20B, the filling axis FA1 may be transverse to, but not intersecting, the driving axis 38. Accordingly, the filling axis FA1 may be aligned with the inner end 70 of the annular inner wall 58 of any given chamber cylinder 30. In other words, the filling axis FA1 is tangent to the annular inner wall 58 defined by the storage chamber cylinder 30. A stem chamber 1200 is a void positioned between the inner end 70 of the annular inner wall 58 and the fill valve 1000, which is seated in the fill port 62A. The fill port 62A (i.e., at least stem chamber 1200 and needle 800) are dimensioned such that once the projection

808 cracks the fill valve 1000, the tip 804 of the needle 800 is positioned within the stem chamber 1200 and not the chamber cylinder 30.

Figure 21A:
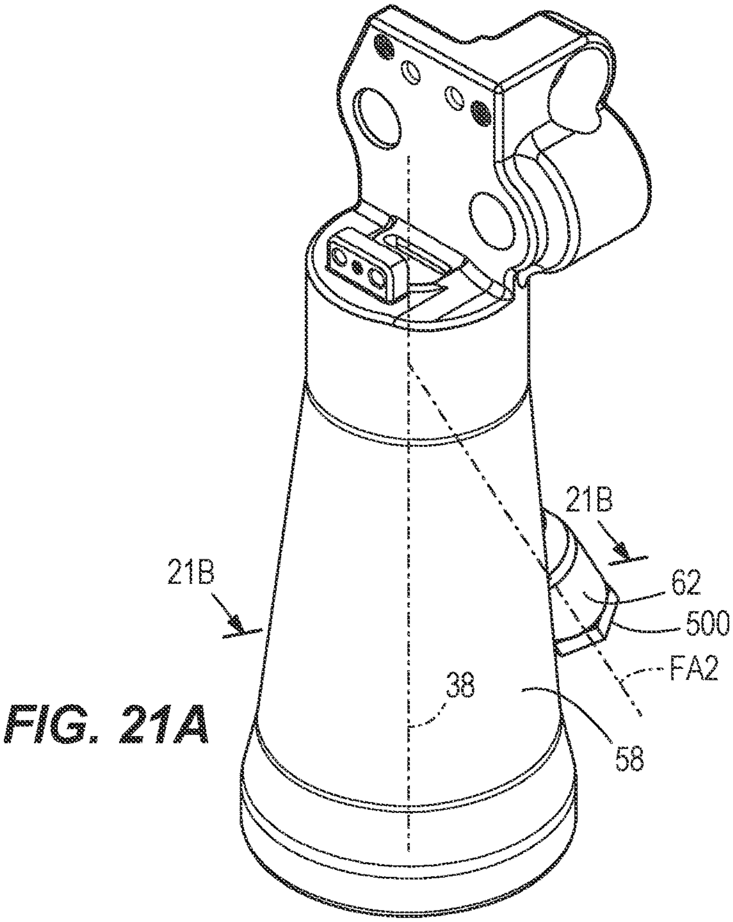
FIG. 21A is a perspective view of a fill valve and an adapter which are obliquely oriented relative to a driving axis of a storage chamber cylinder.
Figure 21B:
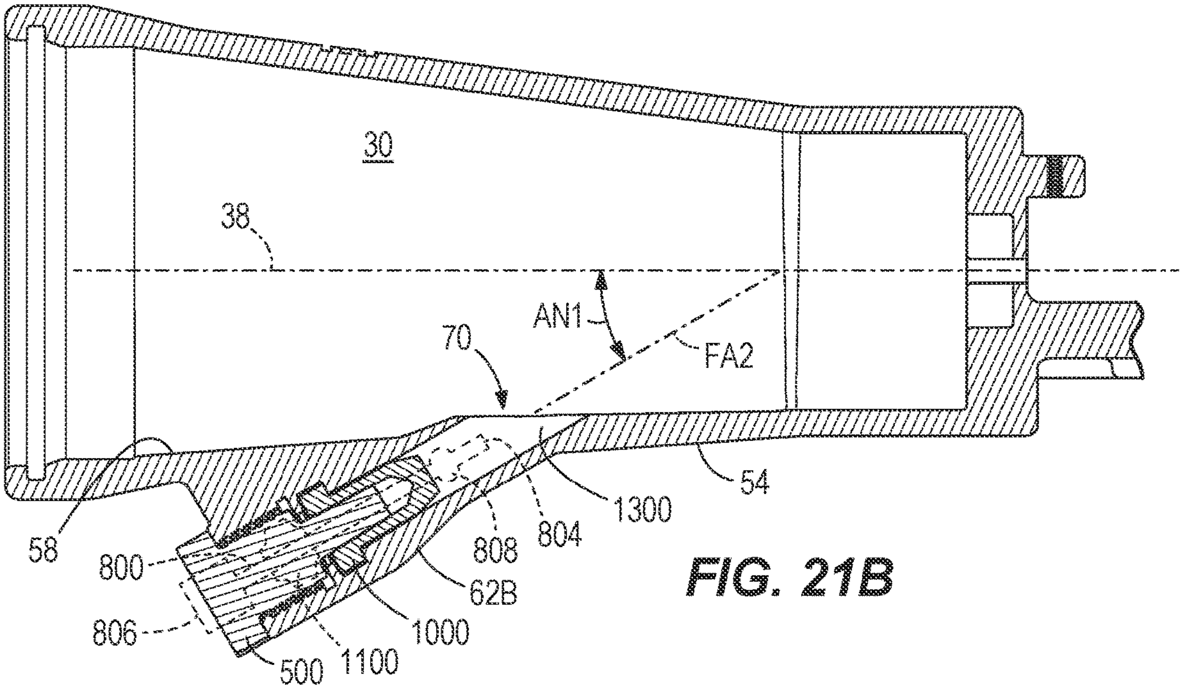
FIG. 21B is a cross-sectional view of the fill valve and adapter of FIG. 21A.

FIGS. 21A-21B illustrate another example fill port 62B extending along a filling axis FA2 that is obliquely oriented relative to the driving axis 38. FIG. 21B best illustrates an angle AN1 between the filling axis FA2 and the driving axis 38. In the illustrated embodiment, the angle AN1 may be approximately 30 degrees. In other embodiments, the angle AN1 may be between 15 degrees and 75 degrees. In other embodiments, the angle AN1 may be between 0 degrees and 90 degrees, or between 90 degrees and 180 degrees. In the illustrated embodiment, the filling axis FA2 intersects the driving axis 38. In other embodiments, the filling axis FA2 need not intersect the driving axis 38. In other words, the filling axis FA2 may be obliquely oriented relative to but not intersect the driving axis 38. As with the fill port 62A illustrated in FIG. 20B, the fill port 62B includes a stem chamber 1300 in the form of a void positioned between the inner end 70 of the annular inner wall 58 and the fill valve 1000, which is seated in the fill port 62B. The fill port 62B (i.e., at least stem chamber 1300 and needle 800) are dimensioned such that once the projection 808 cracks the fill valve 1000, the tip 804 of the needle 800 is positioned within the stem chamber 1300 and not the chamber cylinder 30.

Figure 23B:
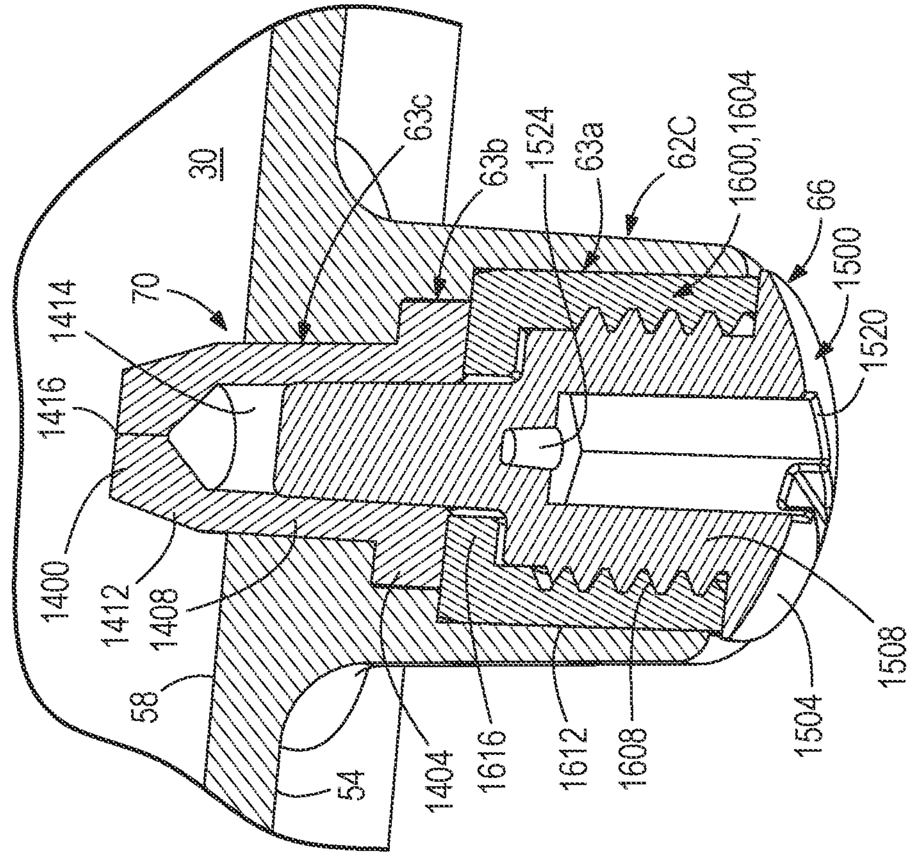
FIG. 23B is another cross-sectional view of the fill valve, adapter, and intermediate block of FIG. 23A.
Figure 23A:
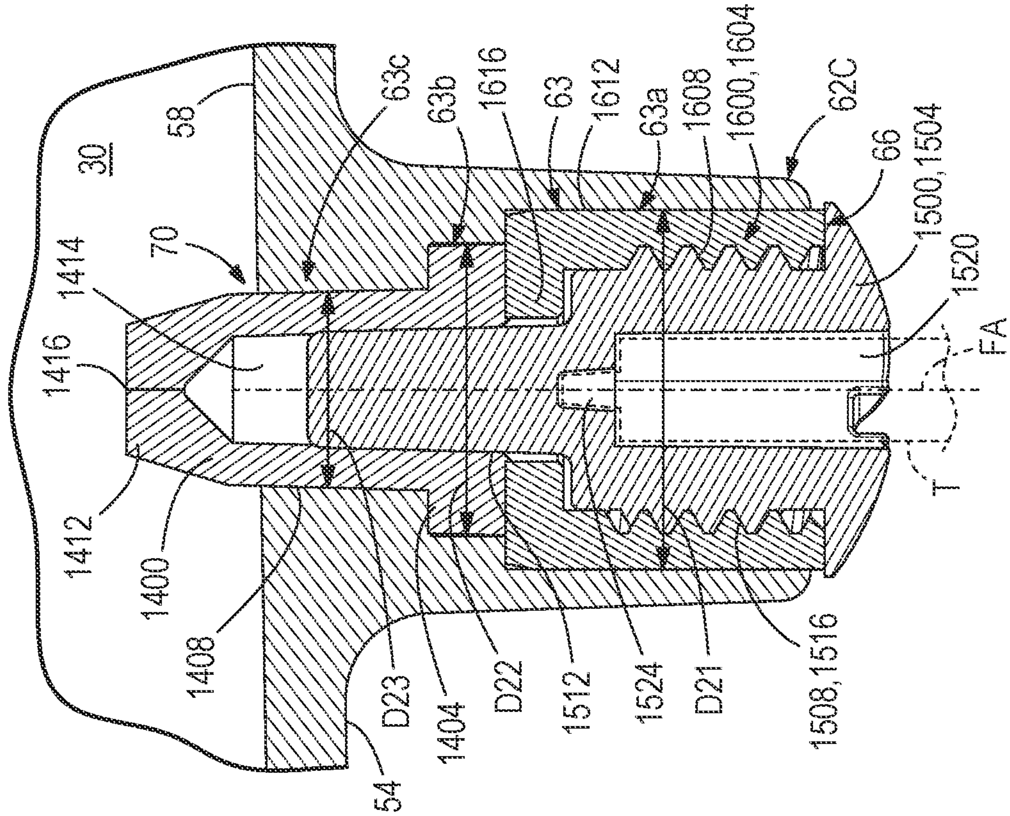
FIG. 23A is a cross-sectional view of a fill valve, adapter, and intermediate block.

FIGS. 23A-23B illustrate another example fill valve 1400, fill port 62C, and plug 1500. The fill valve 1400 is generally shaped and functions similarly to the fill valve 100, with like reference numerals in the 1400 series. The fill port 62C includes a stepped inner surface 63 including an outer portion 63*a* closest to the outer end 66 of the fill port 62C, an intermediate portion 63*b*, and an inner portion 63*c* closest to the inner end 70 of the fill port 62C. The intermediate portion 63*b* is positioned along the filling axis FA between the outer portion 63*a* and the inner portion 63*c*. A diameter D21 of the outer portion 63*a* is nominally greater than a diameter D22 of the intermediate portion 63*b*, and the diameter D22 of the intermediate portion 63*b* is greater than a diameter D23 of the inner portion 63*c*. The fill valve 1400 includes a slit 1416 configured to receive a needle (e.g., the needle 300) to introduce external gas pressure into the storage chamber cylinder 30.

The plug 1500 is generally shaped and functions similarly to the plug 200, with like reference numerals in the 1500 series. Namely, the plug 1500 includes a head portion 1504 and a body portion 1508 between the head portion 1504 and a tip portion 1512 thereof. The head portion 1504 is generally circular in shape about the filling axis FA and is rounded to limit the height of the head portion 1504 sticking out from outer end 66 of the fill port 62C. The plug 1500 includes an aperture 1520 (e.g., a central aperture) dimensioned to receive a tightening tool (e.g., hex key, not shown). The tightening tool may be stored onboard the fastener driver 10 for ease of access. In the illustrated embodiment, the aperture 1520 is hexagonal in cross-section perpendicular to the filling axis FA, although other shapes for the central aperture 1520 are possible. The illustrated aperture 1520 includes a depression 1524 at an and closest to the tip portion 1512 of the plug 1500. The depression 1524 may assist in aligning or locating the tightening tool for engagement with the aperture 1520. In the illustrated embodiment, the depression 1524 is circularly shaped in cross-section, and is slightly tapered in the axial direction. However, in other embodiments, the depression 1524 may be otherwise dimensioned.

The fill valve 1400 and plug 1500 are secured to one another in part by an intermediate block 1600. The intermediate block 1600 includes a cylindrical body 1604 including internal threads 1608 and a cylindrically shaped outer surface 1612. The intermediate block 1600 further includes an axial stop 1616 projecting radially inwardly from the cylindrical body 1604. The intermediate block 1600 is positioned within the outer portion 63*a* of the fill port 62C. The intermediate block 1600 is configured to secure the fill valve 1400 in position at least partially within the intermediate portion 63*b* and inner portion 63*c* of the fill port 62C.

During assembly of the fill valve 1400 and fill port 62C, the fill valve 1400 can be pressed into the intermediate portion 63*b* and inner portion 63*c* of the inner surface 63. After the fill valve 1400 is located in this position, the intermediate block 1600 may be pressed onto the outer portion 63*a* of the inner surface 63. Pressing the intermediate block 1600 may require a substantial amount of force and once in position, a high amount of friction between the intermediate block 1600 and the inner surface 63 inhibits removal of the fill valve 1400 from the intermediate portion 63*b* and inner portion 63*c*. Once in position, the axial stop 1616 of the intermediate block 1600 may press upon a head portion 1404 of the plug 1500. The plug 1500 may then optionally be threaded onto the intermediate block 1600 in a similar manner to the threading of the plug 200 onto the threaded portion 78 of the fill port 62 (FIG. 9). The fill valve 1400, plug 1500, and intermediate block 1600 may be capable of withstanding a high pressure, for example, a pressure in excess of the pressures listed in Table 1 above.

Although the invention has been described in detail with reference to certain preferred embodiments, variations and modifications exist within the scope and spirit of one or more independent aspects of the invention as described.

Various features of the disclosure are set forth in the following claims.

What is claimed is:

1. A powered fastener driver comprising:

a piston cylinder;

a movable piston positioned within the piston cylinder;

a driver blade attached to the piston and movable therewith between a top-dead-center position and a bottom-dead-center position;

a lifter operable to move the driver blade from a driven position corresponding with the bottom-dead-center position toward a ready position;

a storage chamber cylinder enclosing the piston cylinder and defining therewith a storage chamber in which compressed gas is stored;

a fill port coupled to the storage chamber cylinder and in communication with the storage chamber, the fill port comprising an annular ring having a first axial surface, an annular surface, and a second axial surface; and a one-piece fill valve at least partially positioned within the fill port, the fill valve including a body portion defining a receptacle, a tip portion terminating at a tip end, and a slit extending from the receptacle of the body portion to the tip end of the tip portion, the slit being movable between a closed state in which compressed gas in the storage chamber in prevented from being discharged to atmosphere through the fill valve, and an open state which permits the storage chamber to be refilled with compressed gas through the fill valve, wherein a pressure exerted on the tip end of the fill valve by compressed gas within the storage chamber maintains the slit in the closed state, wherein the tip portion is configured to be received in the storage chamber cylinder, and wherein the first axial surface is configured to provide a stop for a plug, and the second axial surface is configured to provide a stop for the fill valve.

2. The powered fastener driver of claim 1, wherein the fill port includes a conforming surface configured to receive the fill valve by an interference fit.

3. The powered fastener driver of claim 2, wherein the conforming surface includes a first annular portion having a first diameter and a second annular portion having a second diameter, wherein the first annular portion being configured to receive at least the body portion of the fill valve, and wherein the second annular portion is configured to receive at least the head portion of the fill valve.

4. The powered fastener driver of claim 1, wherein an entirety of the slit is positioned within the storage chamber cylinder.

5. The powered fastener driver of claim 1, wherein the receptacle includes a counterbore surface which is positioned entirely within the storage chamber cylinder.

6. A powered fastener driver comprising:

a piston cylinder;

a movable piston positioned within the piston cylinder;

a driver blade attached to the piston and movable therewith between a top-dead-center position and a bottom-dead-center position;

a lifter operable to move the driver blade from a driven position corresponding with the bottom-dead-center position toward a ready position;

a storage chamber cylinder enclosing the piston cylinder and defining therewith a storage chamber in which compressed gas is stored;

a fill port coupled to the storage chamber cylinder and in communication with the storage chamber;

a one-piece fill valve at least partially positioned within the fill port, the fill valve including a slit which, in a closed state, prevents compressed gas in the storage chamber from being discharged to atmosphere through the fill valve and, in an open state, permits the storage chamber to be refilled with compressed gas through the fill valve; and a plug configured to engage the fill port to inhibit access of the fill valve, wherein the threads of the body portion are interrupted threads including flattened portions.

7. The powered fastener driver of claim 6, wherein the fill port includes a threaded portion, and the plug includes a body portion including threads, and wherein the threads of the body portion are configured to engage the threaded portion of the fill port to secure the plug to the fill port.

8. The powered fastener driver of claim 6, wherein the fill valve includes a receptacle, and the plug further includes a tip portion configured engage the receptacle to secure the fill valve to the fill port.

9. The powered fastener driver of claim 8, wherein the receptacle includes an inner diameter and the tip portion of the plug includes an outer diameter nominally greater than the inner diameter.

10. The powered fastener driver of claim 6, wherein the plug includes a head portion dimensioned with a size larger than the fill port to secure the plug with the fill port.

11. The powered fastener driver of claim 6, wherein the plug is removable from the fill port to permit access to the fill valve.

* * * * *